United States Patent
Okada et al.

(10) Patent No.: US 6,879,149 B2
(45) Date of Patent: Apr. 12, 2005

(54) WHEEL SUPPORT BEARING ASSEMBLY

(75) Inventors: Koichi Okada, Iwata (JP); Hisashi Ohtsuki, Iwata (JP); Akira Torii, Iwata (JP); Takayuki Norimatsu, Iwata (JP); Hiroaki Ohba, Iwata (JP); Toru Takahashi, Iwata (JP); Masatoshi Mizutani, Iwata (JP)

(73) Assignee: NTN Corporation, Osaka (JP)

( * ) Notice: Subject to any disclaimer, the term of this patent is extended or adjusted under 35 U.S.C. 154(b) by 73 days.

(21) Appl. No.: 10/091,579

(22) Filed: Mar. 7, 2002

(65) Prior Publication Data

US 2002/0130655 A1 Sep. 19, 2002

(30) Foreign Application Priority Data

| Mar. 13, 2001 | (JP) | ......................................... 2001-069930 |
| Apr. 10, 2001 | (JP) | ......................................... 2001-111108 |
| Jul. 31, 2001 | (JP) | ......................................... 2001-231772 |

(51) Int. Cl.$^7$ .............................................. G01P 3/54
(52) U.S. Cl. ..................................... 324/174; 384/448
(58) Field of Search ......................... 324/174; 384/448; 73/514.39; 303/20, 168

(56) References Cited

U.S. PATENT DOCUMENTS

| 5,309,094 A | | 5/1994 | Rigaux et al. |
| 5,790,631 A | * | 8/1998 | Minarczik et al. .............. 379/2 |
| 5,850,141 A | | 12/1998 | Adler |
| 5,898,388 A | | 4/1999 | Hofmann et al. |
| 6,008,638 A | | 12/1999 | Bleckmann et al. |
| 6,109,102 A | | 8/2000 | Schneider |
| 6,184,677 B1 | | 2/2001 | Bleckmann et al. |
| 6,535,135 B1 | * | 3/2003 | French et al. ................ 340/682 |
| 6,542,847 B1 | | 4/2003 | Lohberg et al. |
| 6,585,420 B2 | * | 7/2003 | Okada et al. ................ 384/448 |

FOREIGN PATENT DOCUMENTS

| DE | 196 34 714 A1 | 3/1998 |
| DE | 197 10 337 A1 | 9/1998 |
| EP | 0 569 924 A1 | 11/1993 |
| EP | 0 594 550 A1 | 4/1994 |
| EP | 1 177 959 A2 | 2/2002 |
| JP | 01-156464 | 10/1989 |
| JP | 2001-151090 | 6/2001 |
| WO | WO 98/11356 A1 | 3/1998 |
| WO | WO 99/49322 A1 | 9/1999 |

OTHER PUBLICATIONS

Patent Abstracts of Japan, Publication No. 01–156464, Jun. 20, 1989, Shiga Shoji.

* cited by examiner

*Primary Examiner*—N. Le
*Assistant Examiner*—Reena Aurora
(74) *Attorney, Agent, or Firm*—Staas & Halsey LLP

(57) ABSTRACT

A wheel support bearing assembly for rotatably supporting a wheel 13 relative to a vehicle body structure 12 includes outer and inner members 1 and 2 with dual rows of rolling elements 3 interposed therebetween. An electric generator 4 for generating an electric power as one of the inner and outer members 1 and 2 rotates relative to the other of the inner and outer members 1 and 2 is utilized. The electric generator 4 includes a coil/magnetic element combination 17, including a ring member accommodating a coil therein, and a multi-pole magnet 18. A signal outputted from the electric generator 4 and indicative of the number of revolutions of the wheel 13 is transmitted wireless by a transmitter 5. This transmitter 5 may be an annular transmitter.

8 Claims, 30 Drawing Sheets

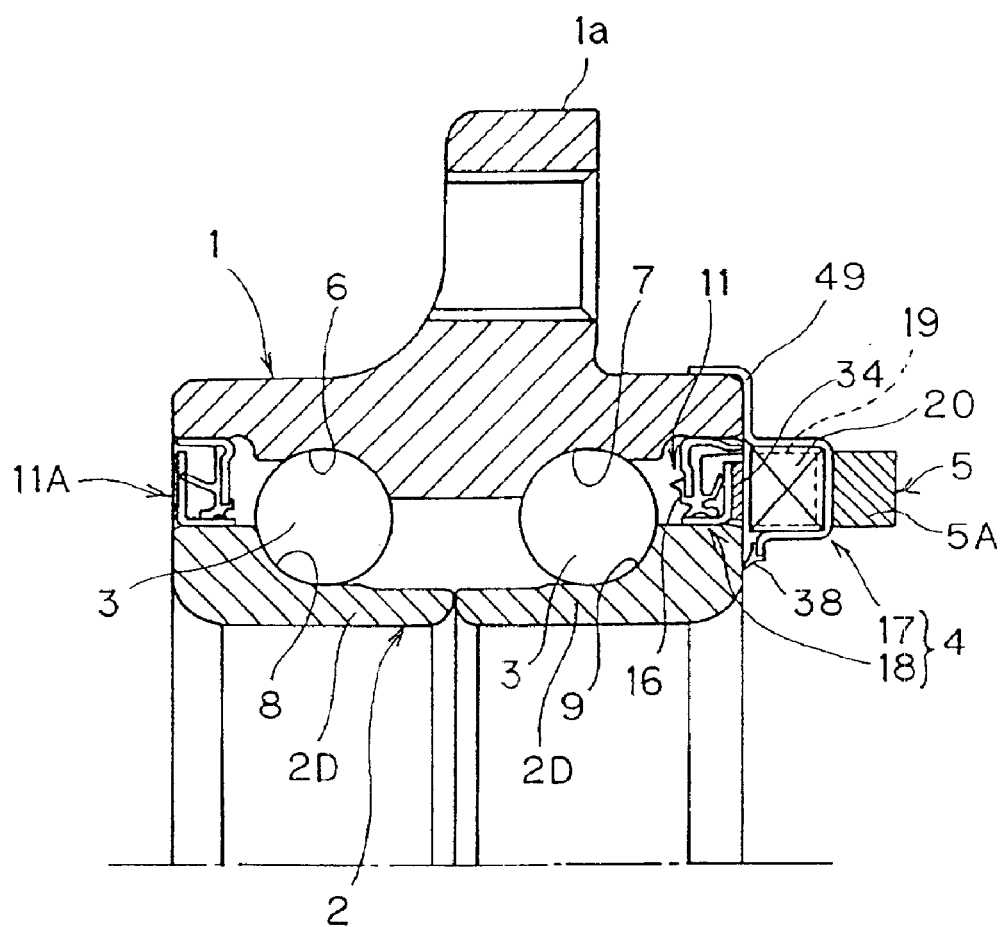

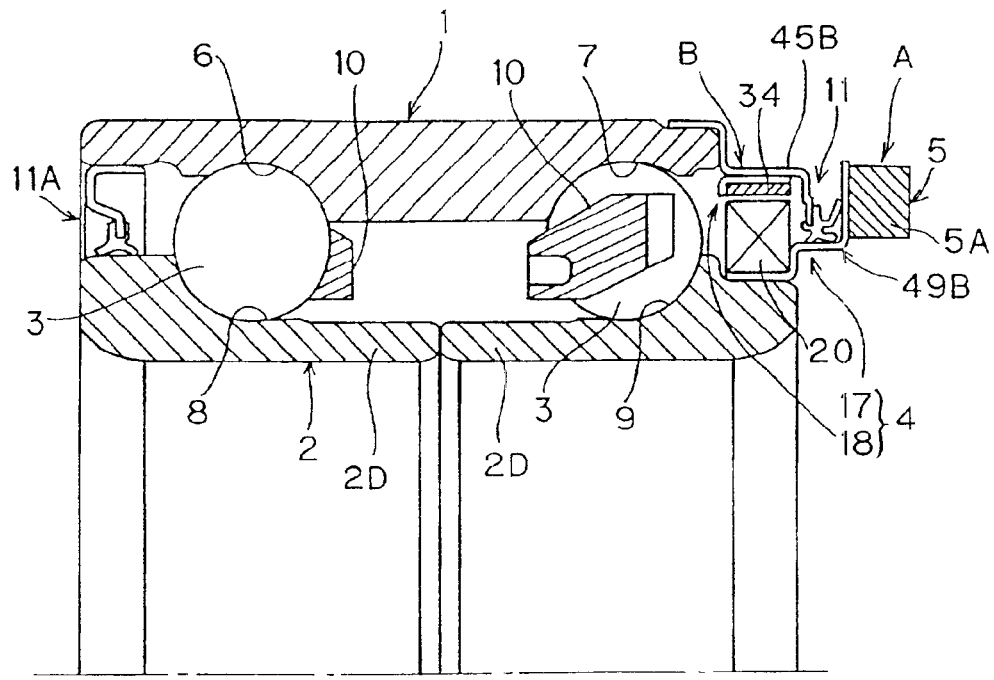
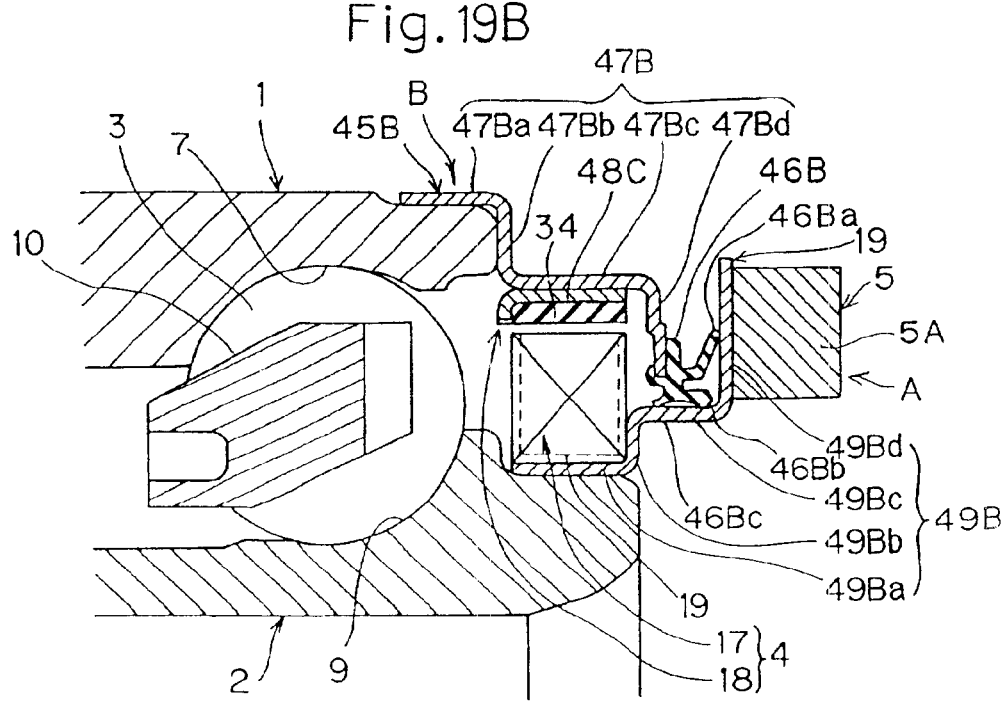

WHEEL SUPPORT BEARING ASSEMBLY

BACKGROUND OF THE INVENTION

1. Field of the Invention

The present invention relates to a wheel support bearing assembly for use in an automotive vehicle and, more particularly, to the wheel support bearing assembly including an electric generator that serves as a means for detecting the number of revolution for an anti-skid braking mechanism.

2. Description of the Prior Art

An anti-skid brake device (ABS), also referred to as an anti-lock brake device, is known as used for detecting the incipiency of a tire lock occurring on a low frictional road surface or at the time of a panic stricken braking so that braking can be relieved to secure a tire grip to thereby stabilize the steerability. A sensor for detecting the number of revolutions of a wheel for detecting the incipiency of the tire being locked is provided in a wheel support bearing assembly. This sensor generally includes a pulsar ring provided at an end portion or the like of a raceway in a bearing outside, and a sensor portion provided in face-to-face relation with the pulsar ring.

Also, as a wheel support bearing assembly having the sensor built therein, such a bearing assembly as shown in FIG. 35 has hitherto been suggested in, for example, the Japanese Laid-open Utility Model Publication No. 1-156464. This known wheel support bearing assembly includes, as shown in FIG. 35, a sensor portion 57 incorporated in a bearing outer race 51 which serves as a stationary member. This known bearing assembly also includes an outer race 51 for securement to a vehicle body structure, an inner race 52 mounted on a shaft portion of a hub wheel 54, a plurality of rolling elements 53 interposed between the inner race 51 and the outer race 52, and a sealing member 60. The rotation sensor 55 is of a structure wherein the sensor portion 57 is inserted into a hole 58 defined in the outer race 51 so as to confront and align with the pulsar ring 56 that is rigidly mounted on an outer peripheral surface of the inner race 52. The use of the sensor built in the bearing assembly is effective to reduce the size of the wheel support bearing assembly as compared with the arrangement in which the pulsar ring and the sensor portion are disposed at the end of the bearing outside.

In the prior art wheel support bearing assembly having built therein the sensor for detecting the number of revolutions of the wheel, a wired interfacing system is generally employed in which detection signals generated by the sensor and supply of an electric power to the sensor are interfaced with the vehicle body structure by means of a wiring. This is not an exception to the known wheel support bearing assembly shown in FIG. 35, in which signal interfacing and supply of the electric power are carried out by means of an electric cable 59. As such, the known wheel support bearing assembly makes use of the electric cable for drawing a sensor output, and this electric cable is exposed to the outside of the vehicle body structure at a location between the wheel support bearing assembly and the vehicle body structure. Because of this, the electric cable is susceptible to breakage by the effect of stones hitting and/or frozen snow within a tire housing. Also, in the case of a steering wheel, not only is it necessary for the electric cable to be twisted beforehand, but often times a relatively large number of processing steps is required. The electric cable referred to above also requires a sheathing thereof and, therefore, reduction in weight of an automotive vehicle tends to be hampered and, in view of the large number of steps of fixing the electric cable, a high cost tends to be incurred.

Also, although the known wheel support bearing assembly of the type in which the sensor is built therein as shown in FIG. 35 can be assembled relatively compact, servicing of the rotation sensor 55 requires dismantling of the outer and inner races 51 and 52 of the wheel support bearing assembly, resulting in a problem that the servicing cannot be performed efficiently. For this reason, once the rotation sensor 55 fails to operate, the wheel support bearing assembly as a whole would be required to replace with a new one. In addition, although the known wheel support bearing assembly shown in FIG. 35 is of the type wherein the rotation sensor is built therein, since the sensor portion 57 is partly exposed outside the bearing assembly, no sufficient reduction in size thereof is still achieved. Yet, the known wheel support bearing assembly shown in FIG. 35 has a problem in that sealing of the hole 58 defined in the outer race 51 for receiving the sensor portion 57 is difficult to achieve, making it difficult to prevent any ingress of foreign matter.

In order to alleviate the foregoing problems, it may be contemplated to use a wireless interfacing system such as disclosed in, for example, the Japanese Patent Application No. 11-339588. According to this application, the rotation sensor used therein is of a type capable of transmitting signal wireless to a receiver. In this wireless interfacing system, the modulation and the directionality of the transmitted waves are carefully selected so that the signal transmitted wireless from the rotation sensor will not be affected adversely by external jamming radio waves.

However, even with the wireless interfacing system, any countermeasures against the external jamming radio waves are insufficient, and so is with illegal high power radio waves that are difficult to suppress. As a result, there is no way of determining whether or not the wireless transmitted signal indicative of the number of revolution of the wheel has been affected by the external jamming radio waves and, hence, there is a high risk that the braking force cannot be properly controlled.

SUMMARY OF THE INVENTION

An object of the present invention is to provide an improved wheel support bearing assembly having a capability of detecting the number of revolutions of a wheel, substantially free from cable breakage occurring outside a vehicle body, and capable of being assembled compact, excellent in servicing of the detecting means for detection of the number of revolution of the wheel, and capable of contributing to reduction in weight and cost of the automotive vehicle.

Another object of the present invention is to provide an improved anti-skid brake device and a method of controlling the same, wherein a detection signal indicative of the number of revolutions of the wheel can be transmitted wireless in the form of a feeble electric signal and wherein the wheel support bearing assembly is employed of a type capable of accurately controlling the braking force without being accompanied by an erroneous operation which would otherwise occur when a normal number of revolutions cannot be recognized in reference to the received signal.

According to one aspect of the present invention, there is provided a wheel support bearing assembly for rotatably supporting a wheel relative to an automotive body structure. This wheel support bearing assembly includes an outer member having an inner peripheral surface formed with dual rows of raceways; an inner member having raceways defined therein in face-to-face relation with the raceways in the outer member; and dual rows of rolling elements accommodated between the raceways in the outer and inner members. An electric generator for generating an electric power as one of the outer and inner members rotates relative to the other of the outer and inner members is uniquely provided in combination with a wireless transmitting means for transmitting wireless a signal indicative of the number of revolutions of the wheel that is outputted from the electric generator.

According to the structure, since the electric generator capable of generating an electric power in response to a relative rotation between the outer member and the inner member is employed, it is possible to detect the number of revolutions of the wheel by the utilization of an output of the electric generator as a signal indicative of the number of revolutions of the wheel. Also, since the use has been made of the wireless transmitting means for transmitting wireless the signal outputted from the electric generator, no electric cable for drawing the detection signal indicative of the number of revolutions of the wheel to a control unit is necessary. Also, since the electric generator is used as a sensor, no electric power supply cable for the supply of an electric power to the sensor is necessary. The electric power obtainable from the electric generator can be used also as an electric power for the wireless transmitting means. For these reasons, no electric cable is exposed to the outside of the vehicle body structure and there is no possibility of the cable being broken, thereby eliminating any complicated and time-consuming wiring job while contributing to reduction in weight and cost of the automotive vehicle.

The wireless transmitting means which can be employed in the practice of the present invention may not be always limited to a type utilizing radio waves, but may be of a type capable of transmitting by means of a magnetic coupling, infrared rays of light, ultrasonic waves or any other signal that can travel in the air.

In a preferred embodiment of the present invention, one of the outer and inner members may have a wheel mounting flange. Also, one of the outer and inner members may have a flange for securement of the wheel support bearing assembly to the vehicle body structure. By way of example, one of the outer and inner members may be provided with the wheel mounting flange whereas the other of the outer and inner member may be provided with a body fitting flange for securement to the vehicle body structure. The wheel support bearing assembly including the wheel mounting flange and the body fitting flange is the one designed to achieve a light-weight feature and a compact structure by unifying the component parts, but the structure in which the electric generator for detection of the rotational speed and the wireless transmitting means according to the present invention is more effective in this wheel support bearing assembly.

In one preferred embodiment of the present invention, the electric generator may include a ring member made of a magnetic material and accommodating a coil therein, and a multi-pole magnet and wherein the ring member is mounted on one of the outer and inner members and the multi-pole magnet is mounted on the other of the outer and inner members.

The use of the multi-pole magnet in the electric generator makes it possible to generate an alternating voltage of a frequency proportional to the number of revolutions at a high frequency so that the alternating frequency can be utilized efficiently to detect the number of revolutions accurately. The use of the ring member made of the magnetic material for accommodating the coil is, when combined with the multi-pole magnet to form the electric generator, effective to achieve an efficient generation of an electric power.

Where the electric generator includes the ring member, made of the magnetic material and accommodating therein the coil, and the multi-pole magnet, the ring member and the multi-pole magnets is preferably arranged between the dual rows of the raceways formed in the outer and inner members.

Disposition of the ring member and the multi-pole magnet between the dual rows of the raceways formed respectively in the outer and inner members is effective to achieve a maximized utilization of the space delimited between those rows of the raceways for accommodating the electric generator in the wheel support bearing assembly. Accordingly, the wheel support bearing assembly even provided with the electric generator can be assembled compact. Also, since the electric generator is made up of the ring member and the multi-pole magnet, the electric generator as a whole can be snugly and neatly accommodated within the wheel support bearing assembly. In addition, there is no need to form an insertion hole for inserting the sensor to a required position inside the wheel support bearing assembly and, hence, the wheel support bearing assembly embodying the present invention is substantially free from a problem associated with possible ingress of foreign matter from the outside into the wheel support bearing assembly through such insertion hole.

Again, where the electric generator includes the ring member, made of the magnetic material and accommodating therein the coil, and the multi-pole magnet, at least one of the ring member and the multi-pole magnet may be integrated together with a sealing member for sealing an open end between the outer and inner members.

If the component part of the electric generator is integrated together with the sealing member disposed at the open end between the outer and inner members, mounting or removal of the electric generator relative to the wheel support bearing assembly can be facilitated and, hence, the servicing and repair of the electric generator can easily be performed. For this reason, there is no need to replace the wheel support bearing assembly with a new assembly in the event of occurrence of any trouble. Also, the freedom of mounting of the electric generator, that is, the freedom of positioning and designing of the electric generator relative to the wheel support bearing assembly can be increased, thereby facilitating compactization of the wheel support bearing assembly. Although mounting or removal of the electric generator may be facilitated even if the electric generator is disposed at one end portion of the outer and inner members, the presence of the component parts of the electric generator separate from the sealing member will make the assembly so bulky enough to hamper compactization and will also require an increased number of component parts accompanied by reduction in assemblability. However, when the component part of the electric generator is integrated together with the sealing member, the electric generator can be snugly and neatly disposed with a reduced number of component parts, resulting in an excellent assemblability.

Where at least one of the ring member and the multi-pole magnet is formed integrally with the sealing member as hereinabove described, an additional sealing member may also be employed for preventing an ingress of foreign matter into a gap between the ring member and the multi-pole magnet. The use of the additional sealing member is effective to avoid any possible ingress of foreign matter into the gap between the ring member and the multi-pole magnet to thereby minimize damages to the electric generator.

In an alternative preferred embodiment of the present invention, the ring member referred to above may have a sectional shape similar to a groove shape or a shape of a figure "C", including a casing portion, in which the coil is accommodated and which has opposite side edges, and a plurality of comb-shaped prongs extending outwardly from each of the opposite side edges of the casing portion, and wherein the prongs extending outwardly from the respective side edges of the casing portion are interleaved with each other. By way of example, where the ring member has a sectional shape representing a groove shape, each of opposite side faces of the groove may have the plurality of the comb-shaped prongs bent to extend towards a side face, with those comb-shaped prongs integral with the respective side faces being alternated in a direction circumferentially of the ring member.

The use of the ring member having the comb-shaped prongs is effective to facilitate multi-polarization and compactization and makes it possible to achieve an efficient generation of the electric power with maximized utilization of magnetic fluxes. Since the ring member having the comb-shaped prongs is employed in combination with the multi-pole magnet, it is possible to achieve a further efficient generation of the electric power. For this reason, even when the electric power necessary to power the transmitting means is secured from the electric generator of the structure referred to above, a sufficient electric power can be obtained.

Where the ring member is of the structure wherein the comb-shaped prongs integral with the opposite side edges thereof alternate one after another in the direction circumferentially of the ring member, those comb-shaped prongs may be interleaved with each other with a gap defined between one of the prongs extending from one of the respective side edges and the neighboring one of the prongs extending from the other of the respective side edges. The presence of the gap between the neighboring prongs is effective to minimize leakage of the magnetic fluxes, rendering the magnetic fluxes to be maximally utilized.

Also, where the ring member is of the structure wherein the comb-shaped prongs integral with the opposite side edges thereof alternate one after another in the direction circumferentially of the ring member, each of the comb-shaped prongs in the ring member may have a width progressively decreasing in a direction towards a free end of the respective prong.

If each of the comb-shaped prongs has a uniform width over the entire length thereof, the magnetic flux density will increase at a root portion thereof where it has been bent, with magnetic saturation tending to occur. However, if each of the comb-shaped prongs has a width progressively decreasing in a direction towards a free end thereof, it is possible to render the magnetic saturation to hardly occur at the root portion thereof. As a result thereof, a further multi-polarization and compactization are possible.

Again, where the electric generator includes the ring member, made of the magnetic material and accommodating therein the coil, and the multi-pole magnet, the ring member made of the magnetic material and accommodating the coil of the electric generator may include an annular magnetic pole portion coaxial therewith, in which magnetic poles of different polarities alternate one after another in a direction circumferentially thereof. In this case, two multi-pole magnets are employed and positioned on respective sides of the magnetic pole portion of the ring member. Where the ring member is provided with the previously described comb-shaped prongs, the arrangement of those comb-shaped prongs defines the magnetic pole portion. The direction in which the magnetic pole portion and the multi-pole magnets are oriented may be either an axial direction or a radial direction.

If the ring member made of the magnetic material and accommodating the coil has the multi-pole magnets disposed on the respective sides of the magnetic pole portion thereof in the manner described above, the surface area of the ring member confronting the multi-pole magnets can increase to increase the magnetic fluxes interlinking the coil and, therefore, the power output of the electric generator can advantageously be increased.

In a preferred embodiment of the present invention, the transmitting means may include an annular transmitter. As compared with a box-type transmitter, for a given transmitter output, the annular transmitter can have reduced sectional dimensions. In generally, a fastening means such as, for example, knuckle for securement to the automotive body structure, a constant speed universal joint and so on are crowded in the vicinity of the wheel support bearing assembly and, therefore, a relatively large space is difficult to secure. However, if the transmitter is made annular in shape, the sectional dimensions thereof can be reduced and, therefore, the annular transmitter can be disposed by the utilization of the limited space available in the wheel support bearing assembly. Also, if the transmitter is made annular in shape, even if the member on which the transmitter is mounted is a member on a rotating side, signal transmission from the transmitting means to the receiving means can be carried out without being accompanied by a large variation in the received signal.

Where the electric generator includes the ring member, made of the magnetic material and accommodating therein the coil, and the multi-pole magnet, the transmitting means may include an annular transmitter, which is integrated together with the ring member forming a part of the electric generator.

If the annular transmitter is integrated together with the ring member of the electric generator, a combination of the electric generator and the transmitting means can be assembled further compact with the number of component parts reduced. For this reason, the assemblability of the wheel support bearing assembly increases.

In the practice of the present invention, where the electric generator includes the ring member, made of the magnetic material and accommodating therein the coil, and the multi-pole magnet, the ring member and the transmitter may be arranged so as to overlap with each other in a direction radially of the ring member.

If the transmitter is made annular, disposition of the transmitter in this manner is effective to prevent a combination of the transmitter and the ring member from protruding axially from the wheel support bearing assembly, rendering it to be compact and, therefore, the space around the wheel support bearing assembly can be utilized maximally. By way of example, while the wheel support bearing assembly used for supporting the drive axle is often combined with the constant speed universal joint, a space available between the wheel support bearing assembly and the constant speed universal joint is generally small and, also, the circumference of such space is small because of the presence of a member or members used to secure the wheel support bearing assembly to the automotive body structure. Accordingly, if the transmitter is made annular in shape and disposed externally around the ring member, the limited space between the wheel support bearing assembly and the constant speed universal joint can be effectively and maximally utilized to accommodate therein the transmitter.

Again, where the electric generator includes the ring member, made of the magnetic material and accommodating the coil therein, and the multi-pole magnet, the transmitting means may include an annular transmitter that is integrated together with the ring member. In this case, the ring member is fitted to an end portion of the inner member. A sealing member for sealing an open end between the inner and outer members may be fitted to the outer member so as to be held in contact with an outer periphery of the ring member.

If the sealing member is contacted to the ring member accommodating therein the coil of the electric generator, to achieve a seal, the ring member itself can perform a function as a sealing member and, therefore, the structure required for sealing can further be compactized.

Furthermore, where the electric generator includes the ring member, made of the magnetic material and accommodating the coil therein, and the multi-pole magnet, the transmitting means may include an annular transmitter that is integrated together with the ring member. In this case, the multi-pole magnet may be formed integrally with a sealing member for sealing an open end between the outer and inner members, and two components made up of an assembly including the transmitter and the ring member and an assembly including the multi-pole magnet and the sealing member may then be used to seal the open end.

With this structure, since the sealing, the electric generator and the transmitting means can be constituted by those two assemblies, the number of component parts used can be reduced and, hence, the assemblability is excellent.

According to another aspect of the present invention, there is provided an anti-skid braking device for, by detecting a rotational speed of a wheel rotatably supported by an automotive body structure by means of the above discussed wheel support bearing assembly, controlling a braking force in response to a detection signal indicative of the rotational speed of the wheel. This anti-skid braking device includes a pulsar ring mounted on a rotary member of a wheel, which serves as the inner member, and constituting a part of the electric generator; a sensor mounted on a wheel support member in face-to-face relation with the pulsar ring and forming another part of the electric generator; a wireless transmitting means including a transmitting means installed on the wheel support member, and a receiving means installed on the automotive body structure; and a controller installed on the automotive body structure for determining a control of a braking force in dependence on a sensor output signal from the sensor and a radio field strength signal. The transmitting means is operable to transmit a signal from the sensor by means of a feeble radio wave, whereas the receiving means receives the feeble radio wave to detect the sensor output signal and the radio field strength signal.

With this anti-skid braking device, the receiving means receives the feeble radio wave and detects the sensor output signal and the radio field strength signal. The controller is operable to determine a control of a braking force in dependence on a sensor output signal and a radio field strength signal. In this way, since the receiving means is so designed as to output the radio field strength signal, the controller can refer to the radio field strength signal to detect that the number of revolutions cannot be correctly recognized with the sensor output signal and, therefore, the control of the braking force can be performed correctly.

In the practice of the present invention, the controller may be designed to controls not to perform an anti-skid braking operation unless a predetermined condition is satisfied in dependence on the sensor output signal and the radio field strength signal.

By so doing, in the event of receipt of the jamming radio waves, the possibility of the anti-skid braking operation being performed erroneously can be avoided. Since the anti-skid braking operation is an operation to relieve the braking action, the anti-skid braking operation should be avoided for safety purpose where the number of revolutions cannot be recognized correctly.

Also, in a preferred embodiment of the present invention, the controller may determine the control in reference to a voltage of a duplex signal in which the sensor output signal and the radio field strength signal are duplexed.

Duplexing of those signals is effective to minimize the number of wiring lines necessitated to connect the receiving means to the controller. While in an automotive vehicle reduction in weight of various component parts used therein is generally required, reduction in number of the wiring lines leads to reduction in weight of the automotive vehicle and also to reduction in number of line connecting steps which in turn results in reduction in cost.

In another preferred embodiment of the present invention, the transmitting means may transmit the feeble radio wave by frequency modulating the sensor output signal, whereas the receiving means detects the sensor output signal and the radio field strength signal by demodulating the feeble radio wave.

The use of the frequency modulating (FM) system makes it possible to facilitate detection of the sensor output signal and the radio field strength signal.

In a further preferred embodiment of the present invention, the controller may include a software program describing procedures to determine the control of the braking force in dependence on the sensor output signal and the radio field strength signal, and a computer capable of executing the software program.

Also, the pulsar ring may be mounted on a rotation side bearing member of the bearing assembly supporting the wheel rotatably, in which case the sensor is mounted on a stationary side bearing member of the bearing assembly. The rotation side bearing member and the stationary side bearing members provide respective parts of, or respective entities of a rotational member and a wheel support member of the wheel.

According to a further aspect of the present invention, there is also provided a method of controlling an anti-skid braking device for, by detecting a rotational speed of a wheel rotatably supported by an automotive body structure by means of the previously discussed wheel support bearing assembly, controlling a braking force in response to a detection signal indicative of the rotational speed of the wheel. This method includes a step of detecting a rotational speed of the wheel by means of a pulsar ring mounted on a rotary member of a wheel, which serves as the inner member, and constituting a part of the electric generator, and a sensor mounted on a wheel support member in face-to-face relation with the pulsar ring and forming another part of the electric generator; a wireless transmitting step of causing the transmitting means, installed on the wheel support member, to transmit a feeble radio wave as a sensor output signal outputted from the sensor, causing the receiving means, installed on the automotive body structure, to receive the feeble radio signal to thereby detect the sensor output signal and a radio field strength signal; and a step of determining, by means of a controller installed on the automotive body structure, a control of a braking force in dependence on the sensor output signal and the radio field strength signal.

With this control method, the control of the braking force can be performed correctly without being accompanied by an erroneous operation which would otherwise occur when the number of revolutions cannot be correctly recognized from the sensor output signal.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 is a fragmentary sectional view of the wheel support bearing assembly according to a fourth preferred embodiment of the present invention, showing only one of longitudinal halves thereof;

FIG. 19A is a fragmentary longitudinal sectional view of the wheel support bearing assembly according to a thirteenth preferred embodiment of the present invention, showing only one of longitudinal halves thereof;

FIG. 19B is a fragmentary enlarged sectional view of a portion of the wheel support bearing assembly shown in FIG. 19A;

DETAILED DESCRIPTION OF THE EMBODIMENTS

A first preferred embodiment of the present invention will now be described with reference to FIGS. 1 to 5. This embodiment is directed to an inner race rotating type of the fourth generation and is illustrative of application to a bearing assembly for support of a drive wheel. This embodiment corresponds to the invention as defined in claim 5.

Figure 1:
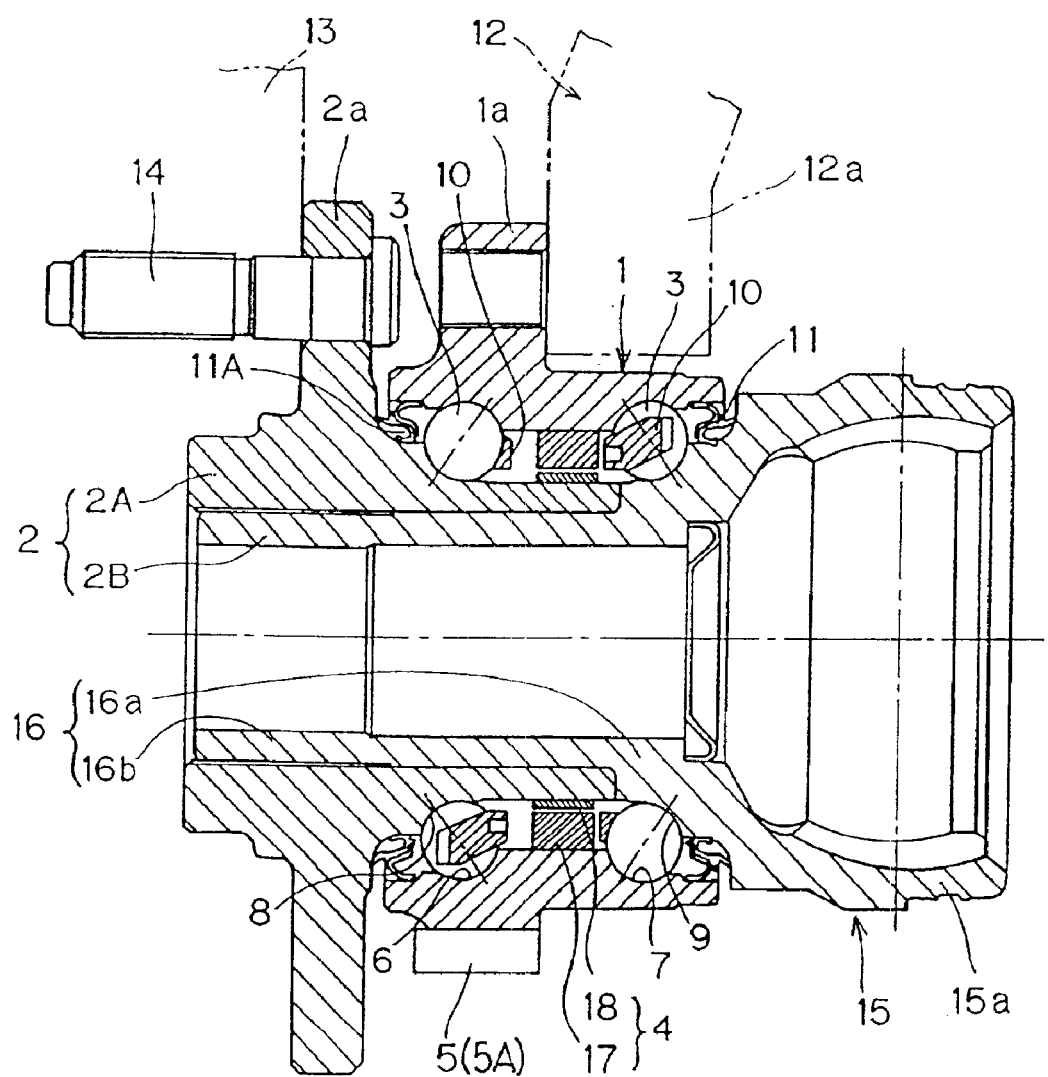
FIG. 1 is a longitudinal sectional view of a wheel support bearing assembly according to a first preferred embodiment of the present invention.

As shown in FIG. 1, the wheel bearing assembly shown therein is of a design in which a plurality of, for example, two, rows of rolling elements 3 are rollingly interposed between an outer member 1 and inner member 2, an electric generator 4 which concurrently serves as a rotation sensor is disposed within an annular space defined between the outer and inner members 1 and 2, and a wireless transmitting means 5 is provided for transmitting wireless a rotational signal indicative of the number of revolutions outputted from the electric generator 4. The electric generator 4 is disposed generally intermediate between the rows of the rolling elements 3 and 3.

The outer member 1 has an inner peripheral surface formed with a plurality of, for example, two, rows of raceways 6 and 7, and raceways 8 and 9 opposed respectively to the raceways 6 and 7 are defined in an outer peripheral surface of the inner member 2. The rows of the rolling elements 3 are rollingly accommodated between the raceways 6 and 8 and between the raceways 7 and 9, respectively. The wheel bearing assembly shown therein is of a type generally referred to as a double row angular contact ball bearing assembly, wherein the raceways 6 to 9 have their respective contact angles so defined as to achieve a back-to-back alignment. The rolling elements 3 are rollingly retained by retainers or cages 10 employed one for each row of the rolling elements 3. Opposite ends of the inner and outer members 2 and 1 are tightly sealed by respective sealing members 11 and 11A.

The outer member 1 has one end formed with a radially outwardly extending vehicle body fitting flange 1a formed therewith for connection with an automotive body structure. Specifically, the vehicle body fitting flange 1a integral with the outer member 1 is adapted to be secured to a wheel bearing support member 12a such as, for example, a knuckle of the automotive body structure 12. It is to be noted that the outer member 1 is of one-piece structure including the vehicle body fitting flange 1a. On the other hand, the inner member 2 has a wheel mounting flange 2a protruding radially outwardly therefrom, to which mounting flange 2a is bolted a wheel 13 by means of a plurality of bolts 14.

Figure 2:
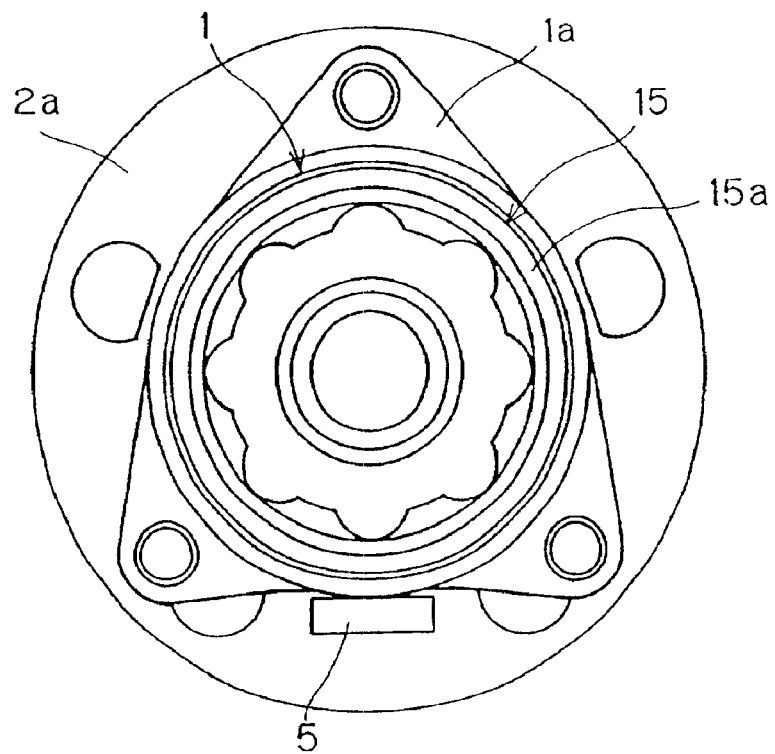
FIG. 2 is an endwise view of the wheel support bearing assembly as viewed from a direction of a constant speed universal joint employed therein.

The inner member 2 includes a hub wheel 2A formed integrally with the wheel mounting flange 2a and another inner race forming member 2B combined with the hub wheel 2A to define the inner member 2. The raceways 8 and 9 are formed on the hub wheel 2A and the inner race forming member 2B, respectively. The inner race forming member 2B is a member formed integrally with an outer race 15a of a constant speed universal joint 15, and an inner race (not shown) of the constant speed universal joint 15 is coupled with a drive shaft (not shown). FIG. 2 illustrates the wheel support bearing assembly as viewed from a direction of the constant speed universal joint 15 employed therein. The inner race forming member 2B has a hollow shaft portion 16 extending integrally from the outer race 15a of the constant speed universal joint 15. The hollow shaft portion 16 has a large diameter portion 16a adjacent the constant speed universal joint 15 and a reduced diameter portion 16b continued from the large diameter portion 16a through a radial step with the hub wheel 2A mounted on the reduced diameter portion 16b. The raceway 9 referred to hereinabove is formed on the large diameter portion 16a. The hub wheel 2A and the inner race forming member 2B are integrated together by means of a plastic coupling such as, for example, by the use of an interference fit (a staking technique).

The electric generator 4 is of a structure wherein a multi-pole magnet 18 is disposed radially inwardly of and in face-to-face relation with a ring-shaped coil/magnetic element combination 17 having a coil built therein. The coil/magnetic element combination 17 is fitted to an inner peripheral surface of the outer member 1, which is a member on a stationary side, and serves as a stator of the electric generator 4. The multi-pole magnet 18 is fitted to an outer peripheral surface of the inner member 2, which is a member on a rotatable side, and, more specifically, to an outer peripheral surface of the hub wheel 2A and serves as a rotor of the electric generator 4.

The wireless transmitting means 5 is provided on a circumferential portion of the outer peripheral surface of the outer member 1 and includes a transmitter having electronic component parts enclosed within an outer casing. The outer casing referred to above is of a box-like configuration and is provided with a transceiver antenna (not shown) enclosed therein. This wireless transmitting means 5 is, for example, a transmitter capable of transmitting signals of feeble radio waves. The signal may be of a kind capable of turning on and off radio waves or of a kind capable of modulating a carrier wave on a frequency modulation scheme or the like. Other than that capable of transmitting radio waves, the wireless transmitting means 5 may be of a kind capable of transmitting by means of a magnetic coupling, transmitting light, for example, infrared rays of light, transmitting ultrasonic waves, or any other transmitter capable of transmitting signals in the air. As an electric power source for the wireless transmitting means 5, the electric generator 4 is used. A receiving means (not shown) cooperable with the wireless transmitting means 5 is installed in, for example, a tire housing (not shown) in the automotive body structure, and signals from the receiving means can be transmitted to a control unit of an anti-skid brake system. The receiving means is fixed at a position within an unobstructed field of view of the transmitting means 5 with no metallic obstruction intervening therebetween, so that the signals such as radio waves transmitted from the transmitting means 5 can be efficiently received by the receiving means. Cables (not shown) for supplying an electric power generated from the electric generator 4 and also for outputting a rotation detection signal are connected between the transmitting means 5 and the coil of the coil/magnetic element combination 17 of the electric generator 4. These cables are passed through a cable hole (not shown) formed in a peripheral wall of the outer member 1 so as to extend completely thereacross in a direction radially thereof, with the cable hole being sealed by a sealant such as an elastic material or a wet-type sealant. It is, however, to be noted that connectors may be employed in place of the cables.

Figure 3A:
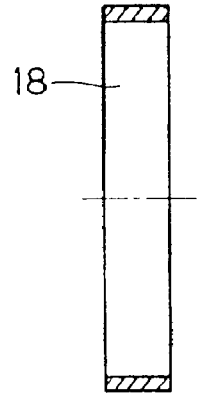
FIG. 3A is a longitudinal sectional view of a multi-pole magnet of an electric generator.
Figure 3B:
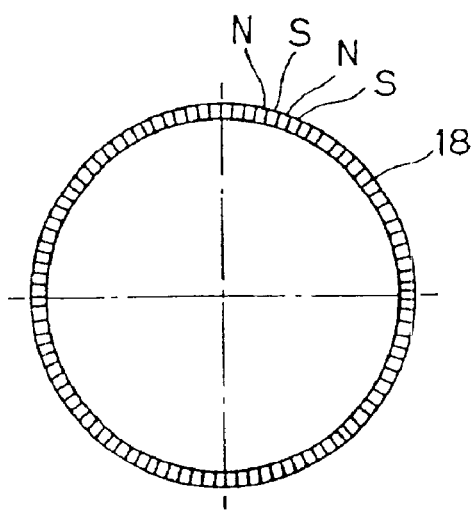
FIG. 3B is a front elevational view of the multi-pole magnet shown in FIG. 3A.

For the electric generator 4, that shown in, for example, any one of FIGS. 3 to 5 can be used. As shown in FIG. 3, the multi-pole magnet 18 is a ring-shaped member having N and S poles arranged alternately in a direction circumferentially thereof.

Figure 4A:
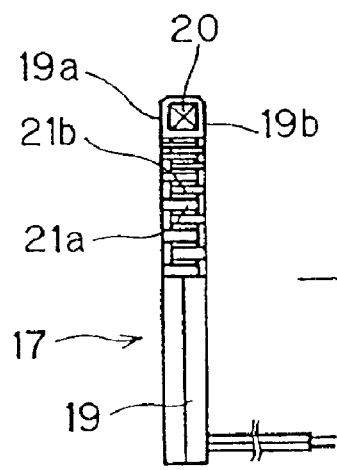
FIG. 4A is a fragmentary side view of a ring member forming a part of the electric generator.
Figure 4B:
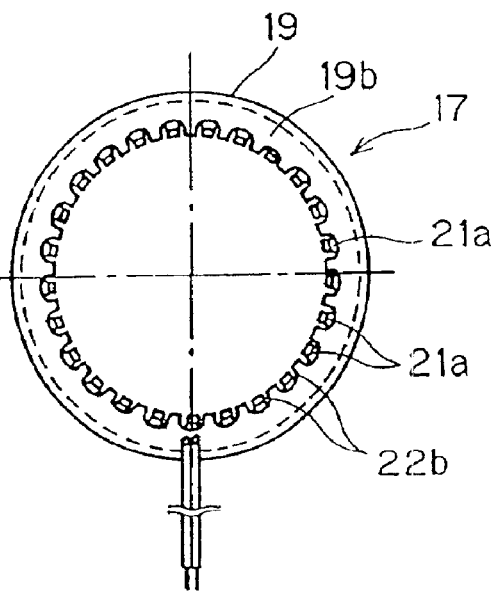
FIG. 4B is a front elevational view of the ring member shown in FIG. 4A.
Figure 5A:
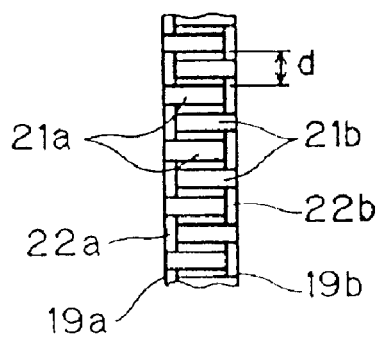
FIG. 5A is an enlarged view showing a portion of FIG. 4A.
Figure 5B:
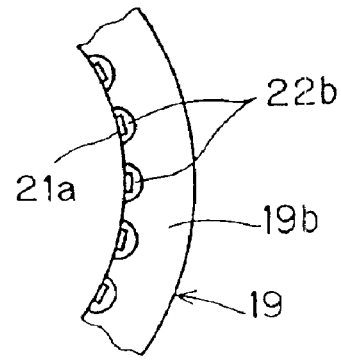
FIG. 5B is an enlarged view showing a portion of FIG. 4B.

The coil/magnetic element combination 17 shown in FIG. 4 is referred to as a claw pole type in which a plurality of magnetic poles made up of claws 21a and 21b of a pole shape are arranged alternately. FIGS. 5A and 5B are diagrams which show respective portions of FIGS. 4A and 4B on an enlarged scale.

More specifically, the coil/magnetic element combination 17 includes a ring member 19 made of a magnetic material and a coil 20 accommodated within the ring member 19. The ring member 19 has a sectional shape resembling to a groove shape oriented towards an inner periphery thereof, that is, the ring member 19 is of a generally U-shaped section opening radially inwardly while having radially inwardly extending annular flanges 19a and 19b forming respective side walls of the ring member 19. Inner peripheral edges of the annular flanges 19a and 19b are formed with respective comb-shaped claws 21a and 21b so as to extend in respective directions opposed to each other such that the comb-shaped claws 21a integral with the annular flange 19a are interleaved with the comb-shaped claws 21b integral with the annular flange 19b in a direction circumferentially of the ring member 19, with all of those claws 21a and 21b being spaced an equal distance from each other in the circumferential direction of the ring member 19. Each line of the comb-shaped claws 21a and 21b forms an annular magnetic pole respectively. Each of the comb-shaped claws 21a and 21b is of a rectangular shape having its longitudinal axis extending parallel to the direction of extension of such claws 21a and 21b. The neighboring claws 21a or 21b are spaced a gap d of a width that is chosen to be, for example, three times the width of each of the claws 21a and 21b.

The inner peripheral edge of each of the annular flanges 19a and 19b of the ring member 19 is formed with a cutout 22a or 22b that is defined between the neighboring claws 21a or 21b so that a free end of each opposite claw 21b or 21a can be positioned within the corresponding cutout 22a or 22b. Each of those cutouts 22a and 22b is preferably of a semicircular shape or a generally U-shape.

This ring member 19 of the structure described above can be prepared from a metal plate of a magnetic material such as, for example, stainless plate by the use of a press work.

It is to be noted that although the ring member 19 is shown as divided into two components along a mid-center line passing intermediate of the width thereof, that is, at the center of a web, it may be of one-piece structure.

With the wheel bearing assembly of the structure described above, since the electric generator 4 is employed, which generate electricity when one of the outer and inner members 1 and 2 rotates relative to the other of the outer and inner members 1 and 2, the number of revolutions of the wheel can be detected by utilizing an output from the electric generator 4 as a signal indicative of the number of revolutions of the wheel 13. Since the electric generator 4 is built in the annular space between the outer member 1 and the inner member 2, the bearing assembly can be assembled compact while securing a function of detecting the number of revolutions. Also, since the transmitting means 5 for transmitting wireless the detection signal indicative of the number of revolutions of the wheel that is outputted from the electric generator 4, no electric cable which would be necessitated to supply the detection signal indicative of the number of revolutions to the control unit is needed.

Also, an electric power generated by the electric generator 4 is used as an electric power source for the wireless transmitting means 5 and, therefore, no electric cable for supplying the electric power from the automotive body structure 12 to the wireless transmitting means 5A is needed. For these reasons, no electric line is exposed outside the automotive body structure, there is no possibility of the electric line being broken, no complicated and time-consuming wiring job is required, the automobile can be manufactured lightweight and the cost thereof can be reduced. Also, since the electric generator 4 in its entirety is built in the annular space delimited between the outer and inner members 1 and 2, no hole which would otherwise be necessitated for exposure of a portion of the electric generator 4 to the outside is necessary, resulting in increase of the sealability.

The hole through which the cable between the electric generator 4 and the wireless transmitting means 5A is passed would be required to be formed in the outer member 1, but since the hole for passage of an electric wire therethrough suffices to be a small hole, the sealing can be achieved easily.

The electric generator 4 is of the structure wherein the coil/magnetic element combination 17 includes the ring member 19 having the interleaved claws 21a and 21b, and the coil 20, which is used in combination with the ring-shaped multi-pole magnet 18. Accordingly, it is easy to attain multi-polarization and compactization and the efficient power generation excellent in efficiency of utilization of magnetic fluxes can be achieved. In particular, since the coil/magnetic element combination 17 is of the structure wherein the gaps between the interleaved claws 21a and 21b are chosen to be so large as to minimize leakage of magnetic fluxes from the neighboring magnetic poles, the efficiency of utilization of the magnetic fluxes can be high.

Figure 6A:
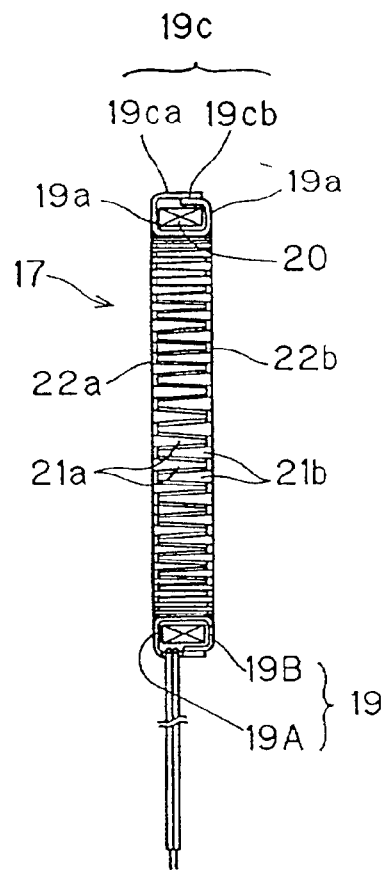
FIG. 6A is a fragmentary side view showing a modification of the ring member used in the electric generator.
Figure 6B:
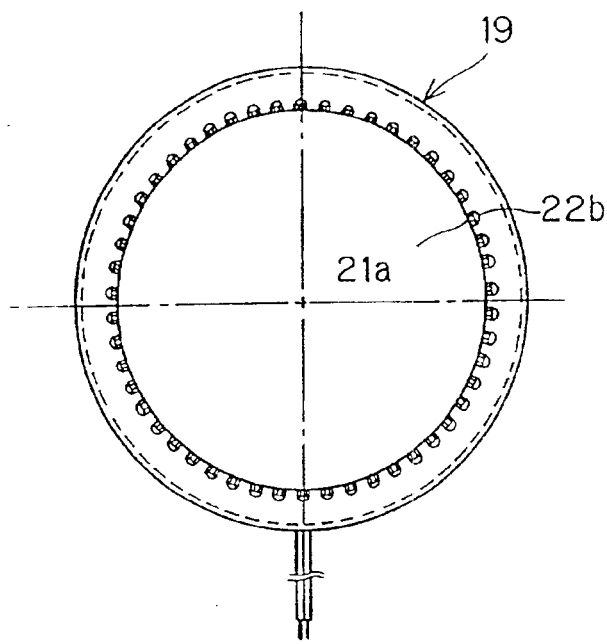
FIG. 6B is a front elevational view of the modified ring member shown in FIG. 6A.
Figure 6C:
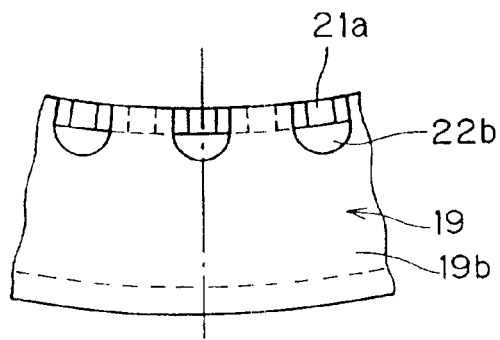
FIG. 6C is a fragmentary enlarged view showing a portion of the modified ring member shown in FIG. 6B.

In place of the structure discussed hereinabove, the electric generator 4 may be of a structure wherein the coil/ magnetic element combination 17 is assembled as shown in FIG. 6. The coil/magnetic element combination 17 shown in FIG. 6 is featured in that each of the interleaved claws 21 and 21b of the ring member 19 is so shaped as to have its width progressively decreasing in a direction towards its free end, that is, outwardly tapered.

The ring member 19 is divided into and made up of a pair of ring segments 19A and 19B. Each of the ring segments 19A and 19B has the corresponding annular flange 19a or 19b and a plurality of web forming pieces 19ca or 19cb extending radially from an outer peripheral edge thereof, and the ring segments 19A and 19B are combined together with the web forming pieces 19ca and 19cb overlapped with each other partly in a widthwise direction thereof. Each of the ring segments 19A and 19B has its inner peripheral edge of the corresponding annular flange 19a or 19b formed with comb-shaped claws 21a or 21b that are bent to protrude in a direction perpendicular to the respective annular flange 19a or 19b. With the ring segments 19A and 19B combined together in the manner described, the comb-shaped claws 21a and 21b integral with the respective flanges 19a and 19b are interleaved with each other at intervals of a predetermined gap in a direction circumferentially thereof.

Other structural features of the coil/magnetic element combination 17 shown therein are substantially similar to those in the coil/magnetic element combination 17 shown in and described with reference to FIGS. 4 and 5. Corresponding parts of the coil/magnetic element combination 17 shown in FIG. 6 are designated by like reference numerals used in connection with the coil/magnetic element combination 17 shown in FIGS. 4 and 5.

Comparing the coil/magnetic element combination 17 having the rectangular claws 21a and 21b as shown in FIGS. 4 and 5 with the coil/magnetic element combination 17 having the tapering claws 21a and 21b as shown in FIG. 6, there is the following merits and demerits.

In the case of the coil/magnetic element combination 17 having the rectangular claws 21a and 21b as shown in FIGS. 4 and 5, it is considered best in terms of the efficiency of utilization of the magnetic fluxes, but the magnetic flux density at root portions of the claws 21a and 21b where the latter are bent from the associated annular flanges 19a and 19b tends to be high and, accordingly, they must have to a certain extend a sectional area enough to avoid magnetic saturation. For this reason, multipolarization and reduction in size are limited.

In the case of the coil/magnetic element combination 17 having the tapering claws 21a and 21b as shown in FIG. 6, no magnetic saturation occur at the root portions of the claws 21a and 21b and, therefore, multipolarization and reduction in size are possible. In other words, since the strength of the magnetic field between the neighboring N and S pole magnets represents a sinusoidal shape, the magnetic field at a transit point between the N pole and the S pole is very weak and, therefore, based on the assumption that no influence will be brought about even when leakage into the neighboring magnetic pole claws 21a and 21b, the claws 21a and 21b are tapered so that no magnetic saturation will occur at the root portions.

The reason that the ring member 19 is rendered to be a split type is only for the purpose of processing, but in the example shown in FIG. 6, the ring member 19 may be an integral part. Also, in the example as shown in FIG. 6, the ring segments 19A and 19B may be butted together by means of web portions 19c as is the case with that shown in FIGS. 4 and 5. Also, in the example shown in FIGS. 4 and 5, the ring member 19 may be of a split type with the web forming pieces partially overlapped with each other as is the case with that shown in FIG. 6.

In the foregoing embodiment, the electric generator 4 has been arranged between the plural raceways. However, the electric generator 4 may be provided at an open end between the inner and outer members 2 and 1 as shown in the following various embodiments as will be described later.

Also, in the foregoing embodiment, the wireless transmitting means 5 has been used in the form of a box-type transmitter provided in a portion of the circumferential direction, but the wireless transmitting means 5 may be in the form of an annular transmitter. In such case, the annular transmitter may be integrated together with the ring member 19 of the electric generator 4.

In the next place, various embodiments of the present invention will be described in which the electric generator 4 is used as a component part of the seal 11 and the wireless transmitting means 5 is employed in the form of an annular transmitter and is integrated together with the ring member of the electric generator 4.

FIGS. 7 to 22 illustrates such other embodiments of the present invention, respectively. In the first place, what is common to those embodiments will be described. In each of those embodiments, the wheel support bearing assembly includes the outer member 1 having the double raceways 6 and 7 defined on the inner peripheral surface thereof, the inner member 2 having the raceways 8 and 9 opposed respectively to the raceways 6 and 7, and the rows of the rolling elements 3 rollingly accommodated between the raceways 6 and 8 and between the raceways 7 and 9, and is used to rotatably support the wheel relative to the automotive body structure 12. This wheel support bearing assembly is in the form of a double row angular ball bearing with the contact angles of the raceways 6 to 9 so defined as to achieve the back-to-back alignment. Each of the rows of the rolling elements 3 is rollingly retained in position by the corresponding retainer or cage 10. The annular space defined between the inner and outer members 2 and 1 has opposite open ends sealed by respective sealing members 11 and 11A. The sealing member 11 is used to seal the open end on an inboard side whereas the sealing member 11A is used to seal the open end on an outboard side.

The electric generator 4 is employed which generates an electric power upon rotation of one of the outer and inner members 1 and 2 relative to the other of the outer and inner members 1 and 2, and the wireless transmitting means 5 is also employed for transmitting wireless the signal indicative of the number of revolutions of the wheel outputted from the electric generator 4.

The electric generator 4 is made up of the ring member 19 made of a magnetic material and accommodating the coil 20 and a ring-shaped multi-pole magnet 18. The ring member 19 is mounted on one of the outer member 1 and the inner member 2 whereas the multi-pole magnet 18 is mounted on the other of the outer member 1 and the inner member 2. The electric generator 4 may be either a thrust type in which the direction in which the coil/magnetic element combination 17 and the multi-pole magnet 18 are opposed to each other, that is, the direction in which magnetic poles are oriented lie in an axial direction of the bearing assembly, or of a radial type in which it lies in a radial direction of the bearing assembly.

At least one of the ring member 19 and the multi-pole magnet 18 is formed integrally with a sealing member which forms a part of the sealing member 11 used to close the open end between the outer and inner members 1 and 2.

The transmitting means 5 is constituted by an annular transmitter 5A, and this transmitter 5A is integrated together with the ring member 19 forming the electric generator 4. The transmitter 5A and the coil 20 are connected together by means of an electric wire or a connection connector (not shown).

Hereinafter, the various embodiments of the present invention will be described.

Figure 7A:
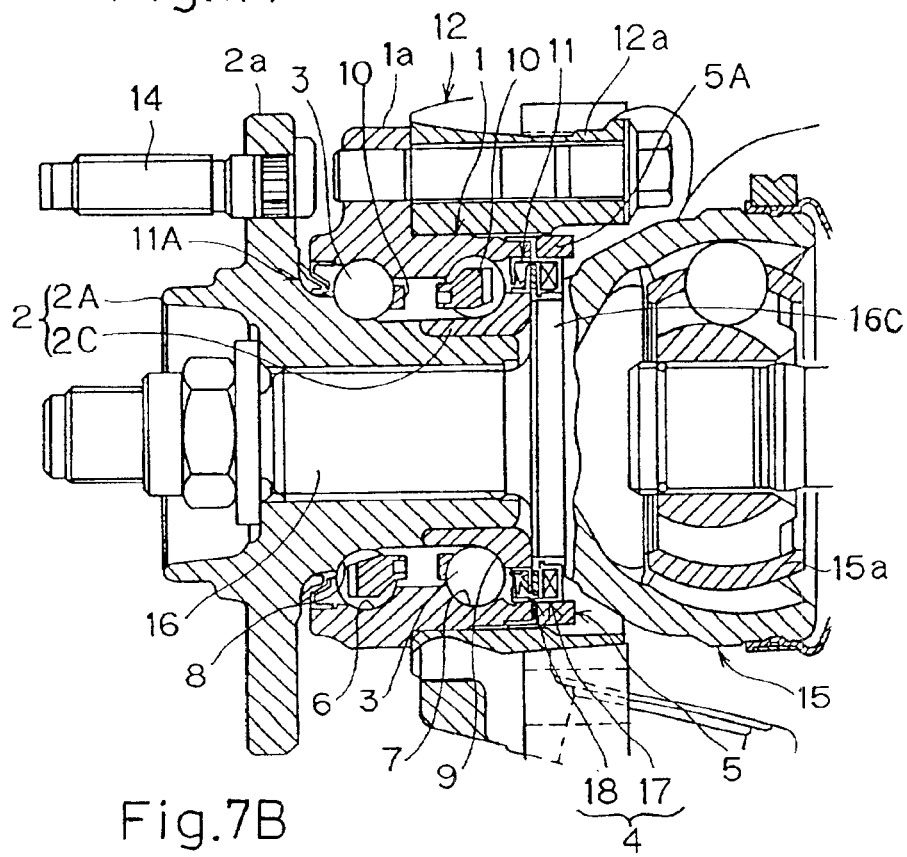
FIG. 7A is a longitudinal sectional view of the wheel support bearing assembly according to a second preferred embodiment of the present invention.

FIG. 7 illustrates a second preferred embodiment of the present invention. The wheel support bearing assembly according to this embodiment is an inner race rotating type of a third generation and is used for the support of the drive axle. The electric generator 4 is the thrust type. This second embodiment corresponds to the invention of Claim 13.

The outer member 1 has a vehicle body fitting flange 1a which is, as is the case with the first embodiment, adapted to be fitted to a wheel bearing support component 12a such as, for example, knuckle of the automotive body structure 12. The inner member 2 includes a hub wheel 2A, and a separate inner race forming member 2C mounted on an outer periphery of the end of the hub wheel 2A. The hub wheel 2A has a wheel mounting flange 2a formed integrally therewith. The raceways 8 and 9 on the inner member 2 are formed on the hub wheel 2A and the inner race forming member 2C, respectively.

The inner member 2 is coupled with an outer ring 15a of the constant speed universal joint 15 that is manufactured separate from the wheel support bearing assembly. The outer ring 15a of the constant speed universal joint 15 has a shaft portion 16 formed integrally therewith so as to extend from outer bottom portion thereof, which shaft portion 16 is inserted into an inner peripheral surface of the hub wheel 2A and is then fixed in position by means of a nut fastened thereto to thereby connect it with the inner member 2. A flat step 16c formed in the outer bottom portion of the outer ring 15a of the constant speed universal joint 15 so as to orient axially thereof is held in abutment with an end face of the inner race forming member 2C to lock the inner race forming member 2c in position.

Figure 7B:
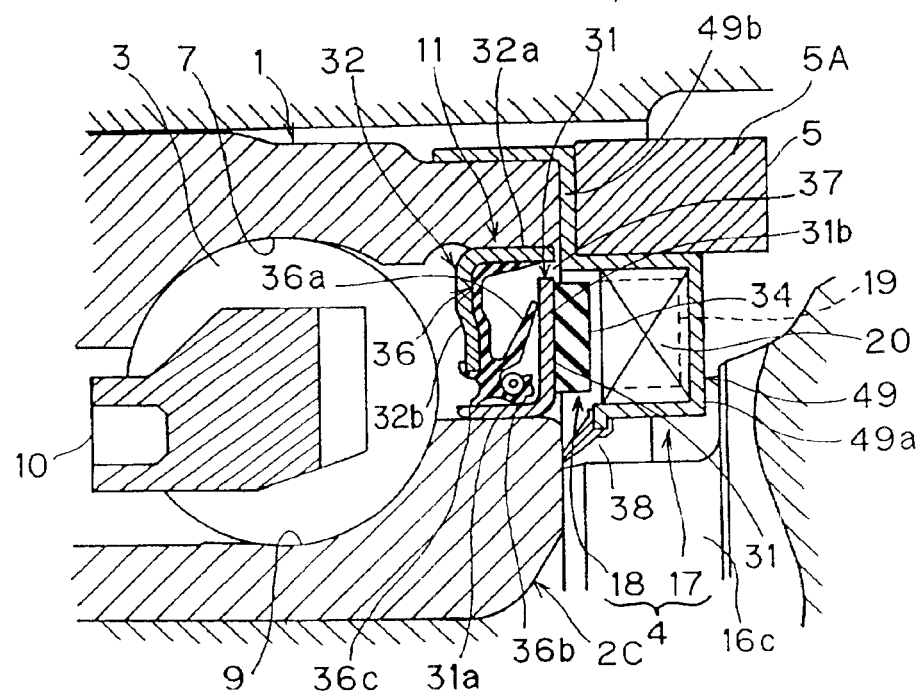
FIG. 7B is an enlarged sectional view showing a portion of the wheel support bearing assembly shown in FIG. 7A.

The sealing member 11 on the bearing backside includes, as shown in FIG. 7B on an enlarged scale, first and second annular sealing members 31 and 32 fitted to the inner and outer members 2 and 3, respectively. These seal members 31 and 32 are fitted in position as press-fitted into the inner and outer members 2 and 3, respectively. Each of the sealing members 31 and 32 is in the form of a plate-like member and is formed so as to represent a generally L-sectioned shape having a cylindrical portion 31a or 32a and an upright plate portion 31b or 32b, with the sealing members 31 and 32 opposing to each other.

Figure 8:
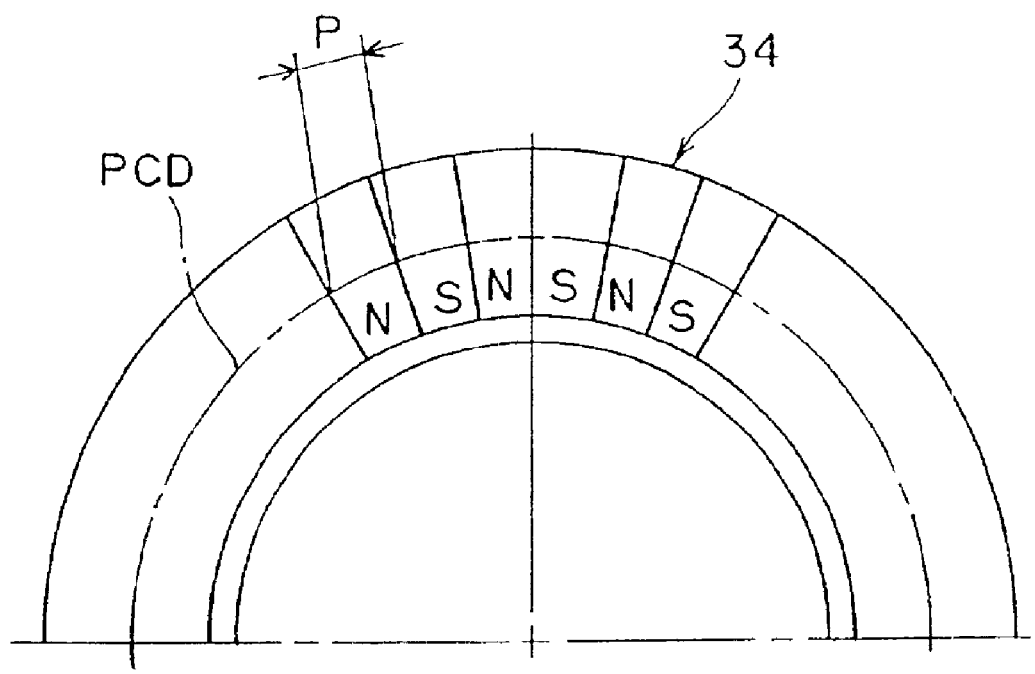
FIG. 8 is a fragmentary front elevational view of one of radial halves of an elastic member which forms the multi-pole magnet of the electric generator used in the bearing assembly shown in FIG. 7A.

The first sealing member 31 is mounted on the inner member 2 which is a member on a rotating side of the inner and outer members 2 and 1. The upright plate portion 31b of the first sealing member 31 is arranged outwardly of the bearing assembly and has an outer side face thereof provided with a magnet member 34 of the multi-pole magnet 18. This magnet member 34 forms the multi-pole magnet 18 of the electric generator 4 together with the first sealing member 31, and the first sealing member 31 is made of a magnetic material. The magnet member 34 is formed with magnetic poles N and S alternating in a circumferential direction thereof as shown in FIG. 8, and the magnetic poles N and S are arranged in a circle having a pitch circle diameter (PCD) and spaced at intervals of a predetermined pitch p. By disposing the coil/magnetic element combination 17 in face-to-face relation with the magnet member 34 of the multi-pole magnet 18 as shown in FIG. 7B, the electric generator 4 concurrently serving as a rotation sensor can be formed.

The magnet member 34 of the multi-pole magnet 18 is made of an elastic member mixed with a powder of magnetic material and is vulcanized to be bonded the first sealing member 31 to form a so-called rubber magnet. It is, however, to be noted that instead of vulcanization the magnet member 34 of the multi-pole magnet 18 may be prepared by hardening a mass of magnetic powders with the use of a bonding material (neodymium bond magnet), which may be subsequently bonded and fixed in position to the first sealing member 31.

The second sealing member 32 has formed integrally therewith a side lip 36a, slidingly engaged with the upright plate portion 31b of the first sealing member 31, and radial lips 36b and 36c slidingly engaged with the cylindrical portion 31a of the first sealing member 31. These lips 36a to 36c are provided as respective portions of the elastic member 36 vulcanized to be bonded the second sealing member 32. The cylindrical portion 32a of the second sealing member 32 and a free end of the upright plate portion 31b of the first sealing member 31 are spaced radially a slight distance to define a labyrinth seal 37.

The coil/magnetic element combination 17 includes the ring member 19 made of a magnetic material and accommodating the coil 20. The ring member 19 is identical with the ring member 19 used in the coil/magnetic element combination 17 described in connection with the first embodiment (FIG. 1) with reference to FIGS. 4 and 5, except that the different direction of orientation of the magnetic polarities is used. In other words, the ring member 19 shown in FIG. 7 has a cross sectional shape similar to a groove as is the case with the ring member 19 in the example of FIGS. 4 and 5 and has a plurality of comb-shaped claws 21a and 22a that are bent from respective open edges of side face of the groove in a direction conforming to the opposite side faces so that the claws 21a and 22a can be alternately interleaved with each other in a direction circumferential of the ring member 19. It is, however, to be noted that the coil/magnetic element combination 17 used in the embodiment of FIG. 7 has, unlike that in FIGS. 4 and 5, the groove opening oriented axially thereof and the magnetic poles defined by the interleaved claws 21a and 22a are oriented axially accordingly. Even in the ring member 19 used in the embodiment of FIG. 7, the interleaved claws 21a and 22a may be tapered as is the case with those shown in FIG. 6.

Referring now to FIG. 7B, the coil/magnetic element combination 17 is fitted to a fitting ring 49 through the ring member 19, and the annular transmitter 5A in the transmitting means 5 is fitted to this fitting ring 49. Thus, when the transmitter 5A and the ring member 19 of the coil/magnetic element combination 17 are fitted to the same fitting ring 49, the transmitter 5A and the ring member 19 of the coil/magnetic element combination 17 can be integrated together. The annular transmitter 5A is arranged on an outer periphery of the ring member 19.

The fitting ring 49 is a molded component of metal and has a transversely oriented groove-shaped portion 49a, in which the coil/magnetic element combination 17 is engaged, and a reverse L-shaped portion 49b extending radially outwardly from an outer peripheral open edge of the groove-shaped portion 49a and extending in the same direction as in which the groove-shaped portion 49a opens. This fitting ring 49 is fitted to the outer member 1 with the reverse L-shaped portion 49b press-fitted into an outer peripheral surface of an end portion of the outer member 1. By this press-fitting, the coil/magnetic element combination 17 can be positioned in face-to-face relation with the open end between the outer member 1 and the inner member 2 and, hence, in face-to-face relation with the multi-pole magnet 18 while the transmitter 5A is positioned in face-to-face relation with an end face of the outer member 1.

This fitting ring 49 substantially enclose the end opening between the outer member 1 and the inner member 2 and concurrently serves as a sealing means for this end opening, and a sealing member 38 for covering the remaining gap between the fitting ring 49 and the inner member 2 is fitted to an inner peripheral open edge of the groove-shaped portion 49a of the fitting ring 49. The sealing member 38 is made of an elastic material such as, for example, rubber and is held in sliding engagement with the end face of the inner member 2. This sealing member 38 is used to prevent foreign matter from entering into a gap between the ring member 19 and the magnet member 34 of the multi-pole magnet 18, both forming respective parts of the coil/magnetic element combination 17, to thereby avoid damages to the electric generator 4. It is to be noted that the sealing member 38 corresponds to a sealing member referred to in Claim 7.

In this embodiment, the following functions and effects can be obtained. since the electric generator 4 is disposed in the open end portion between the outer member 1 and the inner member 2, unlike the case in which the electric generator 2 is disposed inside the bearing assembly such as in the first embodiment, the electric generator 4 can be removed or mounted with no need to dismantle the outer member and the inner member 2 of the bearing assembly and, therefore, the electric generator 4 can easily be maintained and serviced. Also, since the multi-pole magnet 18 of the electric generator 4 is formed integrally with the sealing member 31 at the open end portion between the outer member 1 and the inner member 2, the electric generator 4 can be assembled compact with minimized number of component parts, thereby exhibiting an excellent assemblability.

Since the transmitting means 5 is constituted by the annular transmitter 5A, the transverse section of the transmitter 5A can be reduced and can, therefore, be disposed in a limited space available in the vicinity of the bearing assembly. In other words, where the box-shaped transmitting means 5 is employed as is the case with the first embodiment, the transmitting means 5 is so bulky that the surroundings of the wheel support bearing assembly must be so designed as to provide a space for installation of the box-shaped transmitting means 5. However, where the annular transmitter 5A is employed, the space generally available around the wheel support bearing assembly can be utilized for installation of the transmitter 5A. As can readily be understood from FIG. 7, the space generally available around the wheel support bearing assembly, particularly that available in the vicinity of the open end portion is often a very limited small space since it is surrounded by the constant speed universal joint 15 and the fitting member 12a of the wheel support bearing assembly. Even this very small adjacent space can accommodate the transmitter 5A if the latter is rendered to be annular in shape. In particular, since the constant speed universal joint 15 is positioned close to such adjacent space, such adjacent space is of a shape that can provide a room in a radial direction rather than in an axial direction. However, in the illustrated embodiment, the transmitter 5A is arranged in overlapping relation with the outer periphery of the coil/magnetic element combination 17 and, therefore, it can be effectively and snugly accommodated within such adjacent space as compared with the case in which the both are arranged axially.

Also, in the illustrated embodiment, since the annular transmitter 5A and the ring member 19 of the electric generator 4 are integrated together, the combination of the transmitter 5A and the electric generator 4 can be further compactized, enabling a space for installation to be easily secured and the number of component parts can also be reduced further.

Since the fitting ring 49 used to secure the coil/magnetic element combination 17 and the transmitter 5A covers the multi-pole magnet 18 and, also, since the sealing member 38 is employed to seal between the fitting ring 49 and the inner member 2, undesirable ingress of foreign matter into the gap between the multi-pole magnet 18 and the coil/magnetic element combination 17 can be avoided. By this fitting ring 49 and the sealing member 38, damage to the electric generator 4 which would result from ingress of the foreign matter can be prevented.

The sealing member 11 provides a sealability at the bearing end portion because of the sliding engagement between the seal lips 36a to 36c, provided in the second sealing member 32, and the first sealing member 31 and also because of the presence of the labyrinth seal 37.

Figure 9A:
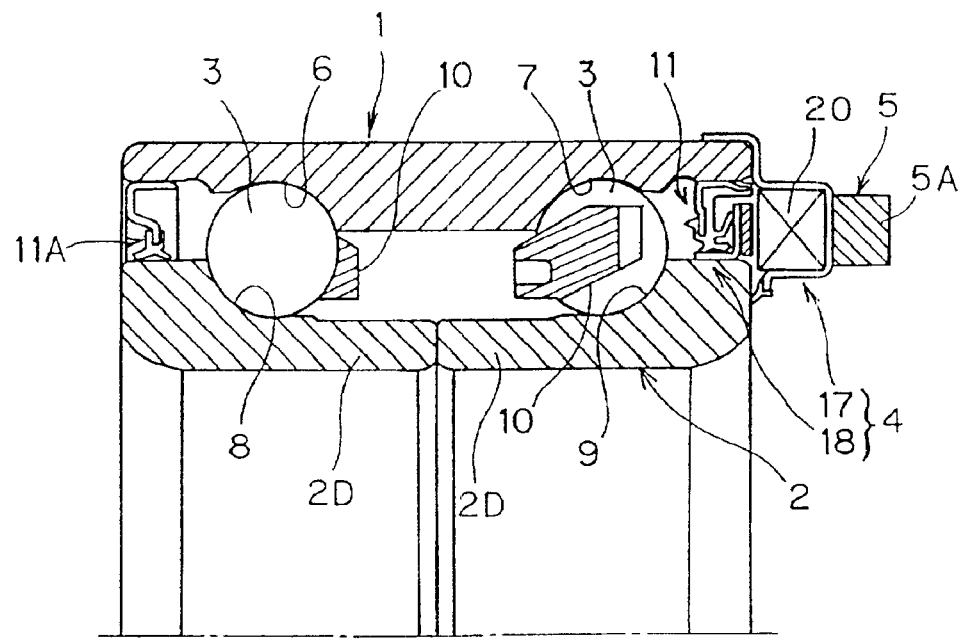
FIG. 9A is a fragmentary longitudinal sectional view of the wheel support bearing assembly according to a third preferred embodiment of the present invention, showing only one of longitudinal halves thereof.
Figure 9B:
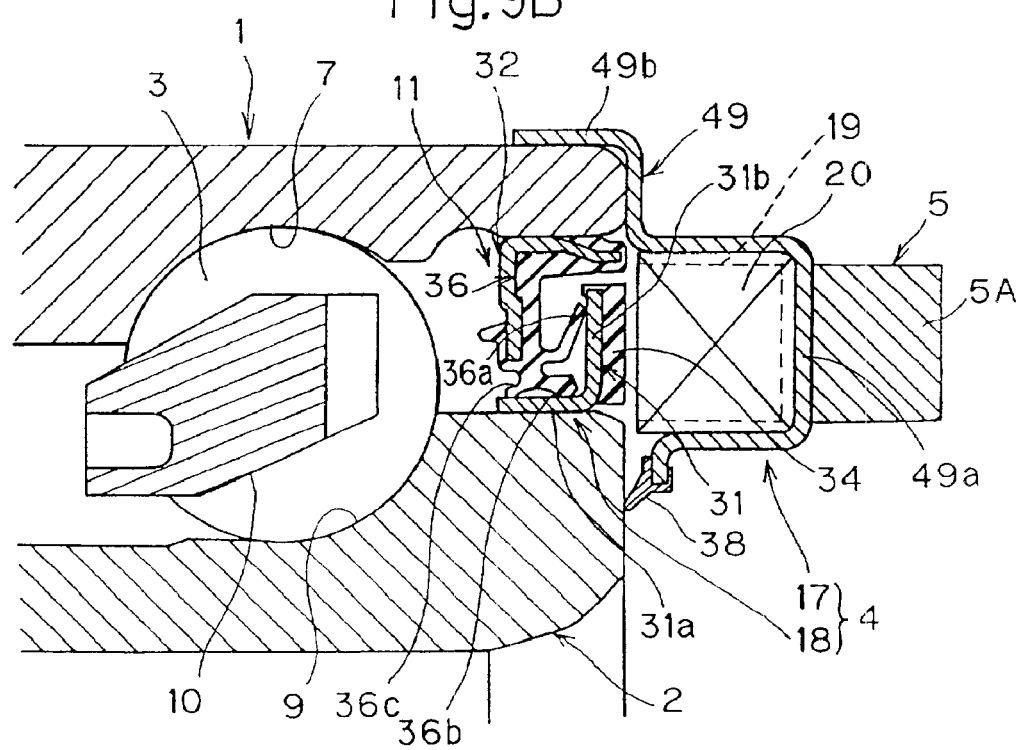
FIG. 9B is a fragmentary enlarged sectional view of a portion of the wheel support bearing assembly shown in FIG. 9A.

FIG. 9 illustrates a third embodiment of the present invention. This embodiment is directed to a first generation of the wheel support bearing assembly of the inner race rotating type wherein the electric generator 4 serving as the rotation sensor is a thrust type.

The outer member 1 serves as a member on a stationary side and is in the form of an independent bearing outer race. The inner member 2 serves as a member on a rotational side and is made up of two bearing inner races 2D arranged axially. None of the outer member 1 and the inner member 2 is provided with any wheel mounting flange and a vehicle body fitting flange.

The sealing member 11 provided at the open end adjacent the backside of the bearing assembly is of the same construction as the sealing member used in the second embodiment (FIG. 7) and includes the first and second sealing members 31 and 32. Even the electric generator 4 is of the same structure as that in the second embodiment and the multi-pole magnet 18 used therein is provided integrally on the first sealing member 31. The coil/magnetic element combination 17 of the electric generator 4 is, as is the case with the second embodiment, fitted to the outer member 1 with the ring member 19 coupled with the fitting ring 49. The fitting ring 49 is of the same structure as that used in the second embodiment and is provided with the sealing member 38.

The transmitting means 5 is, as is the case with that in the second embodiment, in the form of the annular transmitter 5A, but is positioned axially of the coil/magnetic element combination 17. This annular transmitter 5A is fitted to an outer bottom face of the groove-shaped portion 49a of the fitting ring 49.

Even in this embodiment, since the multi-pole magnet 19 of the electric generator 4 is used as a component part of the sealing member 11 and the wireless transmitting means 5 is employed in the form of the annular transmitter 5A which is in turn integrated together with the ring member 19 of the electric generator 4, there is such advantages that the electric generator 4 can be easily serviced and the space for installation of both the electric generator 4 and the transmitting means 5 can be minimized. These advantages can be equally obtained even in the embodiments which will hereinafter be described.

FIG. 10 illustrates a fourth embodiment of the present invention. The wheel support bearing assembly in this embodiment is a wheel support bearing assembly of the inner race rotating type of a second generation and the electric generator 4 serving as the rotation sensor is the thrust type.

In this embodiment, the vehicle body fitting flange 1a is provided in the outer member 1, and other structural features thereof are similar to those shown in and described in connection with the third embodiment with reference to FIG. 9.

Figure 11:
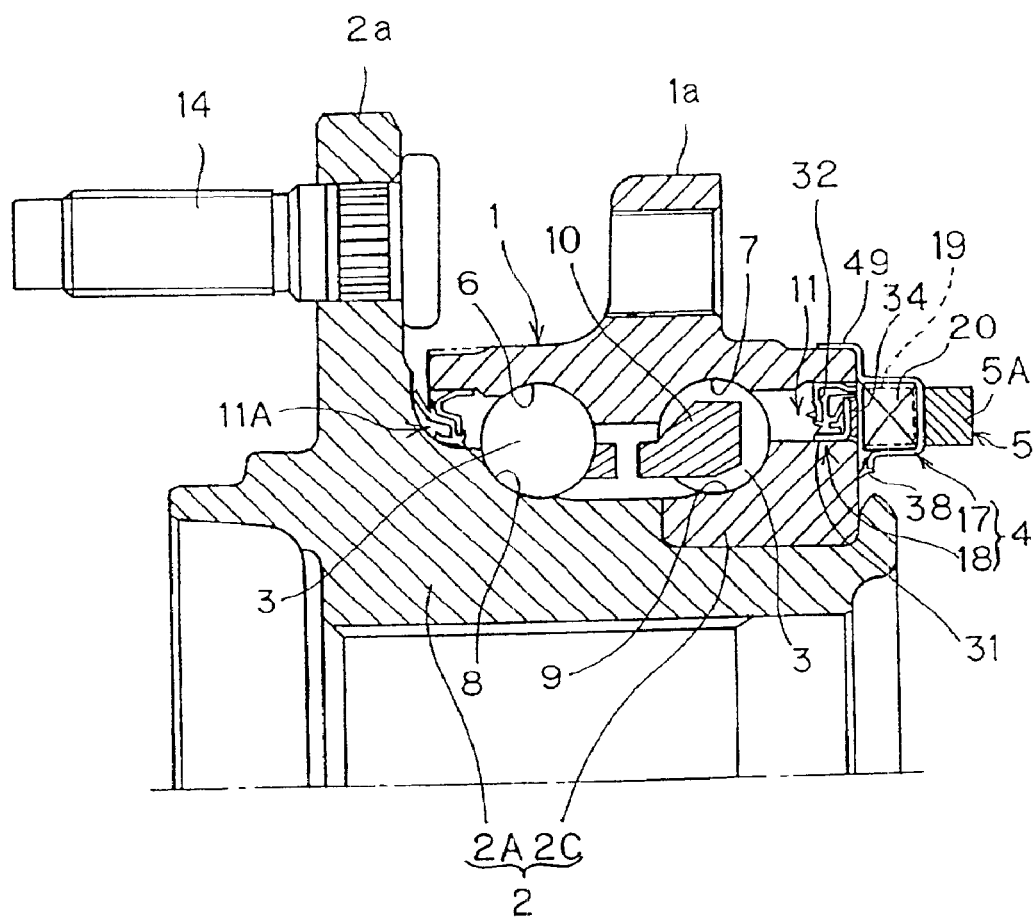
FIG. 11 is a fragmentary sectional view of the wheel support bearing assembly according to a fifth preferred embodiment of the present invention, showing only one of longitudinal halves thereof.

FIG. 11 illustrates a fifth embodiment of the present invention. The wheel support bearing assembly shown therein is a wheel support bearing assembly of the inner race rotating type of a third generation and is used for rotatably supporting the drive axle.

According to this embodiment, in the wheel support bearing assembly of the third generation, the electric generator 4 of the thrust type which concurrently serves as the rotation sensor is incorporated in the sealing member 11, and the ring member 19 of the electric generator 4 is arranged axially of the annular transmitter 5A. The sealing member 11, the electric generator 4 and the transmitting means 5A are, unless otherwise specified, similar to those used in the second embodiment shown in and described with reference to FIG. 7. Briefly speaking, the multi-pole magnet 18 is fixed on the inner member 2 together with the first sealing member 31. The coil/magnetic element combination 17 is fixed on the outer member 1 through the fitting ring 49 to which the ring member 19 is fitted. The annular transmitter 5A is fixed on the fitting ring 49 and positioned on one side of the coil/magnetic element combination 17 remote from the fitting ring 49.

The outer member 1 is a member of one piece structure including the vehicle body fitting flange 1a. The inner member 2 is made up of the hub wheel 2A and a separate inner race forming member 2C mounted on an outer periphery of one end of the hub wheel 2A. The inner race forming member 2C is fixed on the hub wheel 2A by axially fastening a fastening portion provided in the hub wheel 2A. The inner member 2 has a wheel mounting flange 2a, and the inner member 2 is fixed with a shaft portion of the constant speed universal joint (not shown) inserted through an inner peripheral hole thereof.

Figure 12:
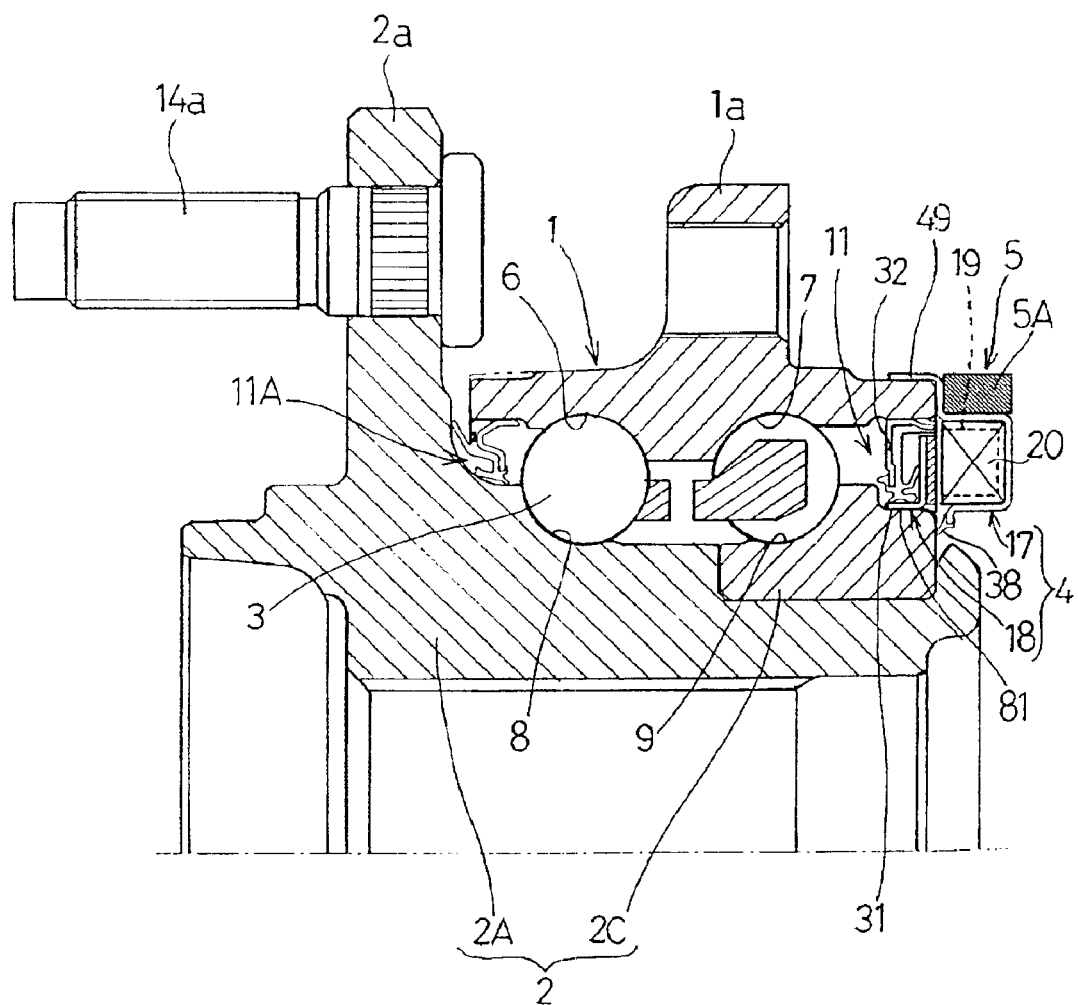
FIG. 12 is a fragmentary sectional view of the wheel support bearing assembly according to a sixth preferred embodiment of the present invention, showing only one of longitudinal halves thereof.

FIG. 12 illustrates a sixth embodiment of the present invention. The wheel support bearing structure shown therein is substantially similar to that according to the fifth embodiment shown in and described with reference to FIG. 11, except that one open end of the bearing assembly, that is, that portion of the bearing assembly where the sealing member 11 is installed is provided with a reduced diameter portion 81 defined in an outer periphery of the inner race to provide an increase space for installation of the sealing member 11 with respect to a radially inward direction so that not only can the multi-pole magnet 18 used therein have a correspondingly increased surface area, but also the electric generator 4 can have a correspondingly increased size. The reduced diameter portion 81 referred to above is set back radially inwardly of the inner race forming member 2C by means of a step and is hence defined in the inner race forming member 2C.

The formation of the reduced diameter portion 81 enables the use of the electric generator 4 of a type having a reduced axial length. In other words, the electric generator 4 even though increased in size in a radial direction can have a correspondingly reduced axial length. Thus, the structure in which the sealing member 11 is permitted to have an increased size in the radially inward direction by the provision of the reduced diameter portion 81 in the outer periphery of the inner race as discussed above is generally adopted in the wheel support bearing assembly in which the component parts including the sealing member 11 and the electric generator 4 are integrated together.

It is to be noted that in the sixth embodiment of the present invention as discussed above, the annular transmitter 5A of the transmitting means 5 is mounted externally on the coil/magnetic element combination 17 while having been fixed to the fitting ring 49.

Figure 13:
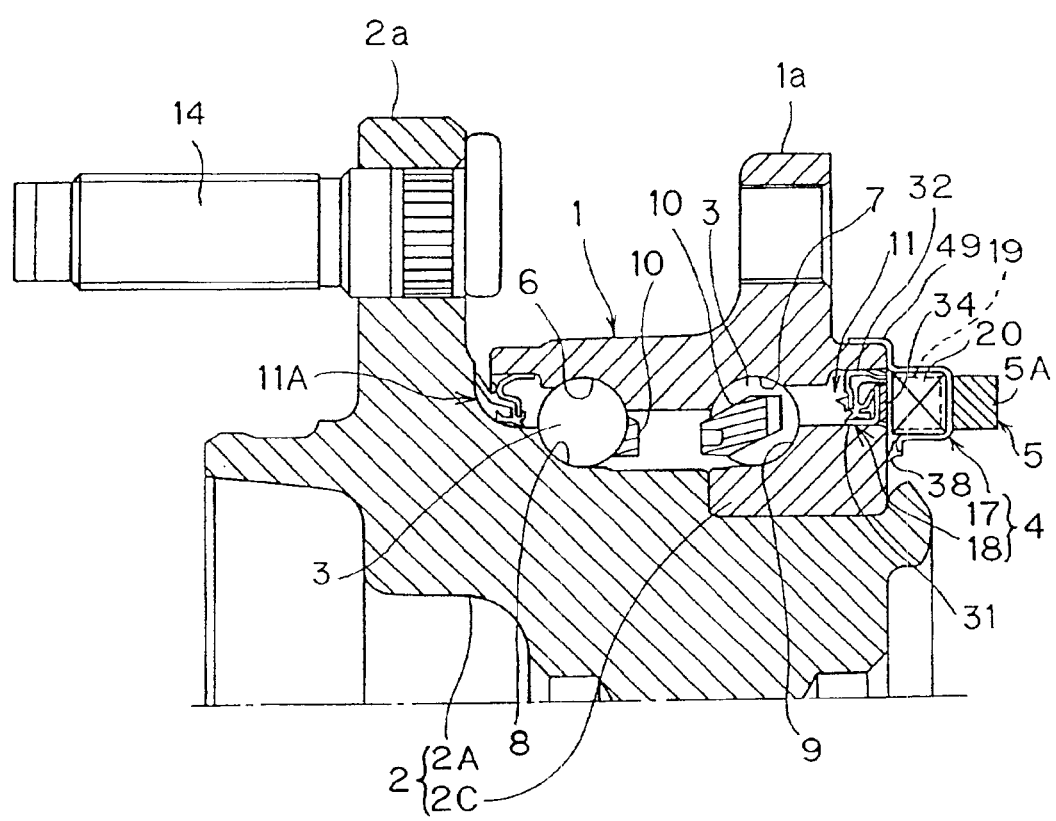
FIG. 13 is a fragmentary sectional view of the wheel support bearing assembly according to a seventh preferred embodiment of the present invention, showing only one of longitudinal halves thereof.

FIG. 13 illustrates a seventh embodiment of the present invention. The wheel support bearing assembly shown therein is the inner race rotating type of a third generation and is used to support a driven axle. The electric generator 4 concurrently serving as the rotation sensor is the thrust type.

Since this embodiment is for the support of the driven axle, the inner member 2 is of a shape having no inner peripheral hole. Other structural features thereof are substantially similar to those described in connection with the fifth embodiment with reference to FIG. 11.

Figure 14:
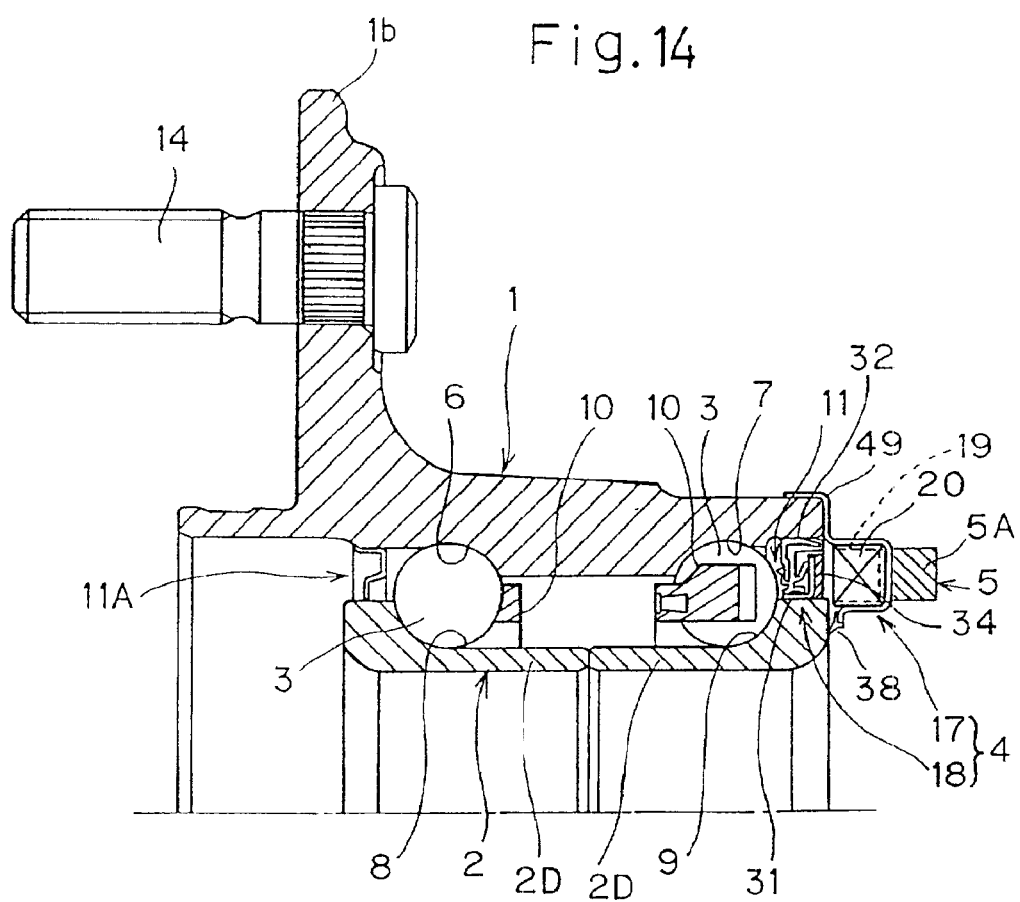
FIG. 14 is a fragmentary sectional view of the wheel support bearing assembly according to an eighth preferred embodiment of the present invention, showing only one of longitudinal halves thereof.

FIG. 14 illustrates an eighth embodiment of the present invention. The wheel support bearing assembly shown therein is an outer race rotating type of a second generation, wherein the electric generator 4 serving as the rotation sensor is the thrust type.

The outer member 1 has a wheel mounting flange 1b at one end thereof which defines a front surface thereof. The inner member 2 is of a split type in which two bearing inner races 2D are arranged axially. The sealing member, the electric generator 4 and the transmitting means 5 are similar to those described in connection with the third embodiment with reference to FIG. 9. In this embodiment, the outer member 1 serves as a member on a rotating side and, therefore, the transmitter 5A forming the transmitting means 5 fitted to the outer member 1 rotates together with the outer member 1. However, since the transmitter 5A used therein is of an annular configuration, rotation of the transmitter 5A will not adversely affect as a variation in detection signal on a receiving side.

Figure 15:
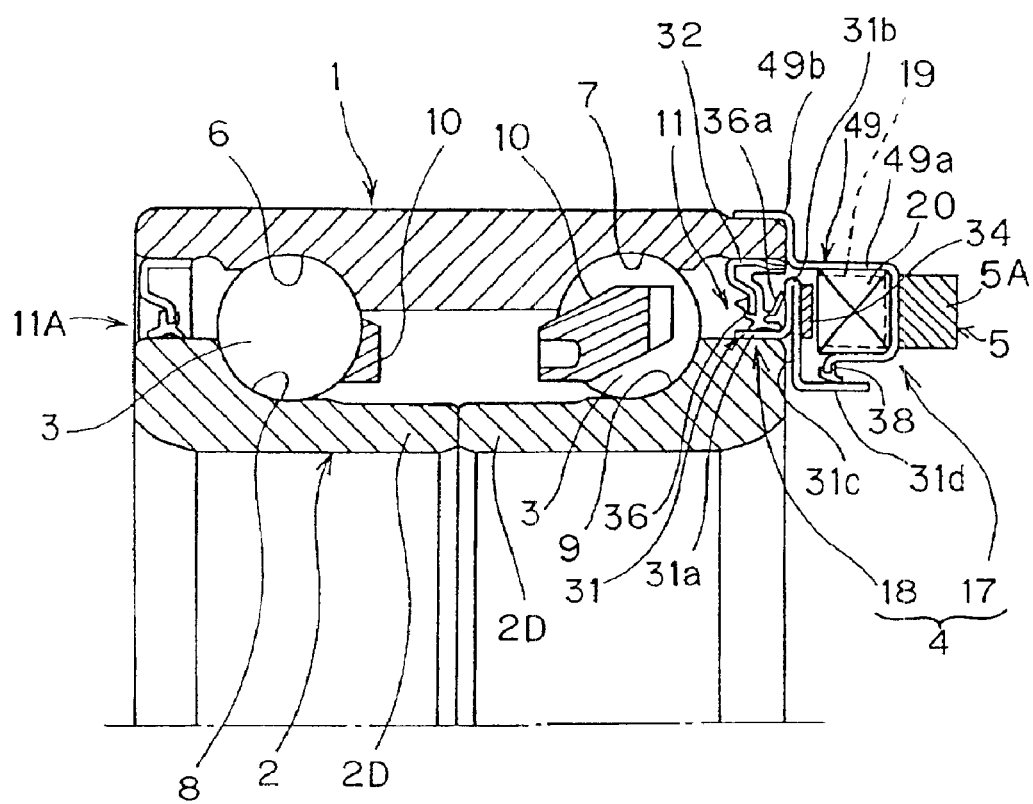
FIG. 15 is a fragmentary sectional view of the wheel support bearing assembly according to a ninth preferred embodiment of the present invention, showing only one of longitudinal halves thereof.

FIG. 15 illustrates a ninth embodiment of the present invention. The wheel support bearing assembly shown therein is an inner race rotating type of a first generation, wherein the electric generator 4 serving as the rotation sensor is the thrust type.

The outer member 1 serves as a member on the stationary side and is constituted by an independent bearing outer race. The inner member 2 serves as a member on the rotating side and includes two bearing inner races 2D arranged axially. The outer member 1 and the inner member 2 have no wheel mounting flange and vehicle body fitting flange.

The sealing member 11, the electric generator 4 and the transmitting means 5A are, except for the following features, similar to those described in connection with the third embodiment with reference to FIG. 9. In the illustrated embodiment, the first sealing member 31 of the sealing member 11 includes a cylindrical portion 31a, an upright plate portion 31b bent radially outwardly from the cylindrical portion 31a, a buck-turned upright plate portion 31c turned radially inwardly from a free end of the upright plate portion 31b, and an outer cylindrical portion 31d bent from a radially inner end of the back-turned upright plate portion 31c so as to extend outwardly from the bearing assembly. The back-turned upright plate portion 31c extends a further radially inwardly than the cylindrical portion 31a. The magnet member 34 of the multi-pole magnet 18 is disposed on a side face of the back-turned upright plate portion 31c facing outwardly of the bearing assembly. The sealing member 31 is press-fitted into an outer peripheral surface of one end portion of the inner member 2, while the back-turned upright plate portion 31c has an inner peripheral portion positioned outside the end face of the inner member 2.

Although the coil/magnetic element combination 17 of the electric generator 4 is fitted to the outer member 1 by means of the fitting ring 49 which is the same as that used in the third embodiment, the sealing member 38 provided on an inner peripheral portion of this fitting ring 49 defines an outer peripheral surface of the outer cylindrical portion 31d of the first sealing member 31.

In the case of this embodiment, as compared with the third embodiment, although a combination of the sealing member, the electric generator 4 and the transmitter 5A may have an increased axial length, the sealing member 38 is held in contact with the outer peripheral surface of the outer cylindrical portion 31d and, therefore, no sealing function will decrease even if the position at which the first sealing member 31 is fitted axially changes to a certain extent.

Figure 16A:
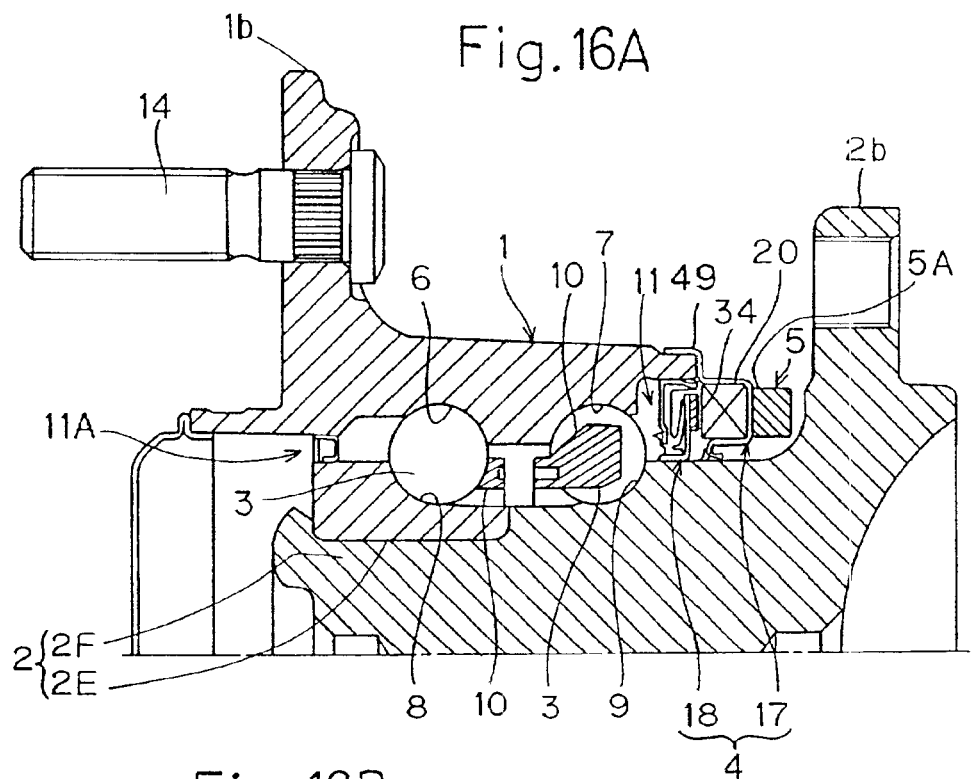
FIG. 16A is a fragmentary longitudinal sectional view of the wheel support bearing assembly according to a tenth preferred embodiment of the present invention, showing only one of longitudinal halves thereof.
Figure 16B:
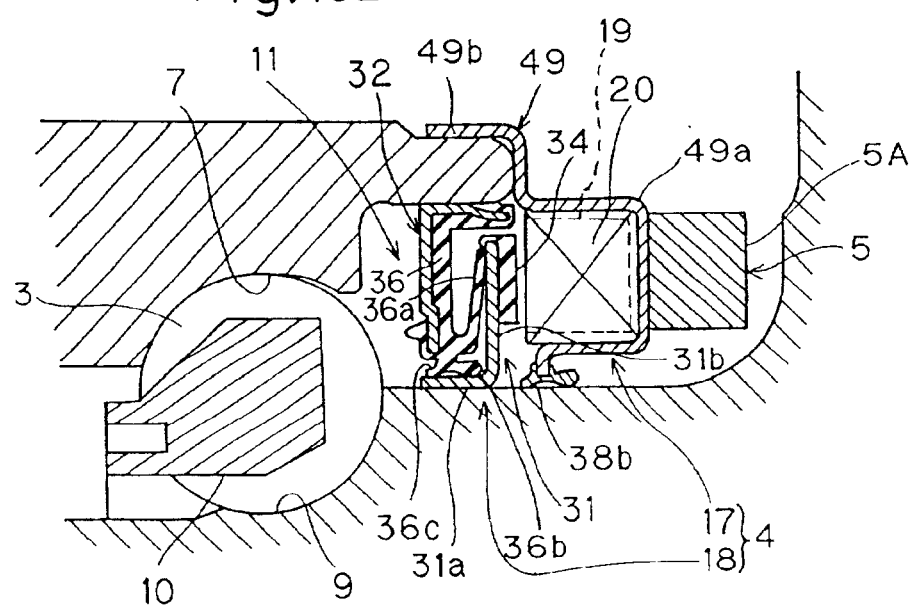
FIG. 16B is a fragmentary enlarged sectional view of a portion of the wheel support bearing assembly shown in FIG. 16A.

FIG. 16 illustrates a tenth embodiment of the present invention. This embodiment is an outer race rotating type of a third generation and is used to support the driven axle. The electric generator 4 that serves as the rotation sensor is the thrust type.

The outer member 1 has one end on a front side where the wheel mounting flange 1b is formed. The inner member 2 is made up of two inner race forming members 2E and 2F, the inner race forming member 2F being formed with the vehicle body fitting flange 2b. The vehicle body fitting flange 2b is positioned on one side of the rear end portion of the outer member 1 adjacent the rear surface. The inner race forming member 2E is arranged at one end adjacent the front surface and is fixed by means of a fastening portion provided in the inner race forming member 2F.

The sealing member 11, the electric generator 4 and the transmitting means 5 are, except for the following features, similar to those described in connection with the third embodiment with reference to FIG. 9. In this embodiment, the first sealing member 31 of the sealing member 11 is press-fitted and mounted in a portion between the raceway 9, defined on the outer peripheral surface of the inner member 2, and the vehicle body fitting flange 2b. The coil/magnetic element combination 17 of the electric generator 4 and the transmitter 5A are fitted to the outer member 1 by means of the same fitting ring 49 as that used in the third embodiment, but the sealing member 38 provided in the inner peripheral portion of this fitting ring 49 is held in sliding engagement with the outer peripheral surface of the inner member 2.

In the case of this embodiment, although in the outer periphery of the inner member 2, a groove-shaped space is created between the end portion of the outer member I and the vehicle body fitting flange 2b, such outer peripheral space of the inner member 2 is effectively utilized to accommodate the electric generator 4 and the transmitter 5A since the electric generator 4 and the annular transmitter 5A overlap with each other in the axial direction.

Figure 17A:
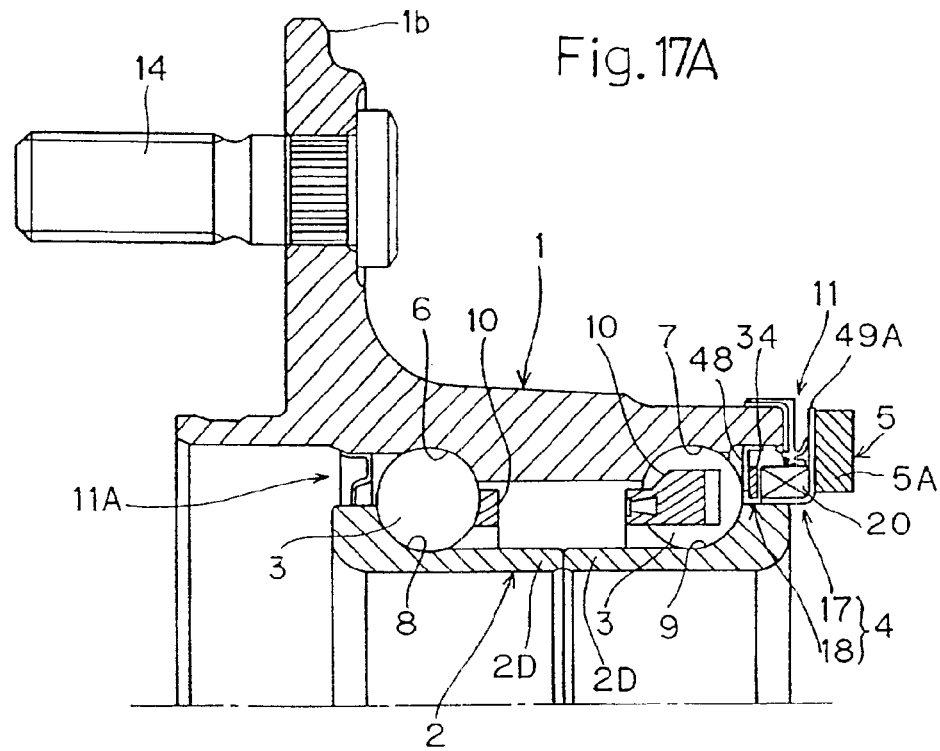
FIG. 17A is a fragmentary longitudinal sectional view of the wheel support bearing assembly according to an eleventh preferred embodiment of the present invention, showing only one of longitudinal halves thereof.
Figure 17B:
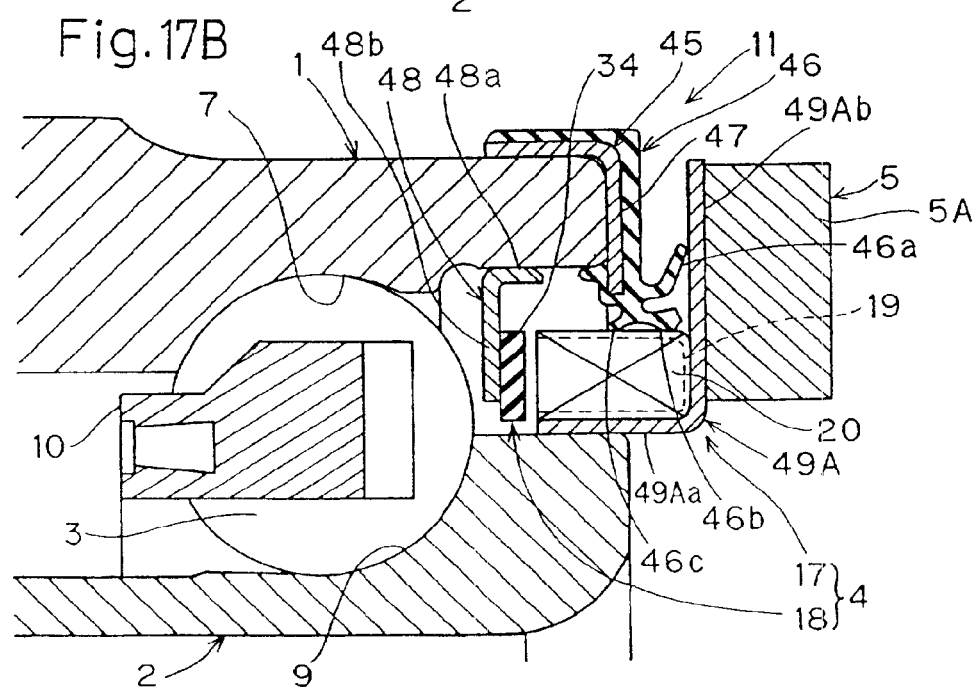
FIG. 17B is a fragmentary enlarged sectional view of a portion of the wheel support bearing assembly shown in FIG. 17A.

FIG. 17 illustrates an eleventh embodiment of the present invention. The wheel support bearing assembly in this embodiment is the outer race rotating type of a second generation, in which the thrust type electric generator 4 is employed as the rotation sensor. This embodiment corresponds to the invention as set forth in Claim 14.

The outer member 1 is a member on the rotating side and has a wheel mounting flange 1b formed at one end thereof adjacent the front surface. The inner member 2 is a member on the stationary side and is of a split type including two bearing inner races 2D arranged axially.

The transmitting means 5 is constituted by an annular transmitter 5A. This transmitter 5A is integrated together with the ring member 19 of the coil/magnetic element combination 17 by securing it to the fitting ring 49A that is common to the coil/magnetic element combination 17 forming a part of the electric generator 4. The fitting ring 49A is a generally L-sectioned plate member including a cylindrical portion 49Aa and an upright plate portion 49Ab, with the coil/magnetic element combination 17 fitted around an outer periphery of the cylindrical portion 49Aa, and the annular transmitter 5A is fitted to an outer side face of the upright plate portion 49Ab. The fitting ring 49A is mounted on an outer peripheral surface of the inner member 2 by the cylindrical portion 49Aa having been press-fitted into the inner member 2, wherefore the ring member 19 of the coil/magnetic element combination 17 and the transmitter 5A are mounted on an outer periphery of one end of the inner member 2.

The electric generator 4 is comprised of the multi-pole magnet 18 and the coil/magnetic element combination 17 that face with each other, with the multi-pole magnet 18 fitted to an inner peripheral surface of the outer member 1. The multi-pole magnet 18 is comprised of a ring-shaped substrate 48 and a magnet member 34. The ring-shaped substrate 48 is of a generally reversed L-section including a cylindrical portion 48a and an upright plate portion 48b and is mounted with the cylindrical portion 48a press-fitted into an inner peripheral surface of the outer member 1. The magnet member 34 is fixed to the ring-shaped substrate 48 and, except for this feature, this magnet member 34 is the same as the magnet member 34 which has been shown in and described with reference to FIG. 8.

The coil/magnetic element combination 17 is the same as the coil/magnetic element combination 17 used in the embodiments shown in FIG. 7, et seq., and includes the coil 20 accommodated within the groove-shaped ring member 19. Although the coil/magnetic element combination 17 has a generally flattened sectional shape in which the width thereof in the axial direction is larger than the width in the radial direction, but it may not be always flat in sectional shape.

The sealing member 11 includes a sealing member 45 fitted to the outer member 1 and held in sliding engagement with an outer peripheral surface which is a groove side wall portion of the groove-shaped ring member 19. The sealing member 45 is comprised of a core metal 47 and an elastic member 46 formed integrally with the core metal 47. The core metal 47 is formed to represent a generally reverse L-sectional shape and is mounted as press-fitted into the outer periphery of one end of the outer member 1. The elastic member 46 includes lips 46b and 46c, held in sliding engagement with an outer peripheral surface of the ring member 19 of the coil/magnetic element combination 17, and a lip 46a held in sliding engagement with the upright plate portion 49Ab of the fitting ring 49A.

In this structure, since sealing is achieved by causing the sealing member 45 to contact the ring member 19 accommodating the coil 20 of the electric generator 4, the ring member 19 itself functions as a sealing member and, therefore, the structure for sealing can further be compactized. Also, not only the multi-pole magnet 18 of the electric generator 4, but also a portion of the coil/magnetic element combination is arranged in between the outer member 1 and the inner member 2 and, therefore, protruding portions of the electric generator 4 and the transmitter 5A that protrude outwardly from the bearing assembly are reduced, thereby further reducing the space for installation.

Figure 18:
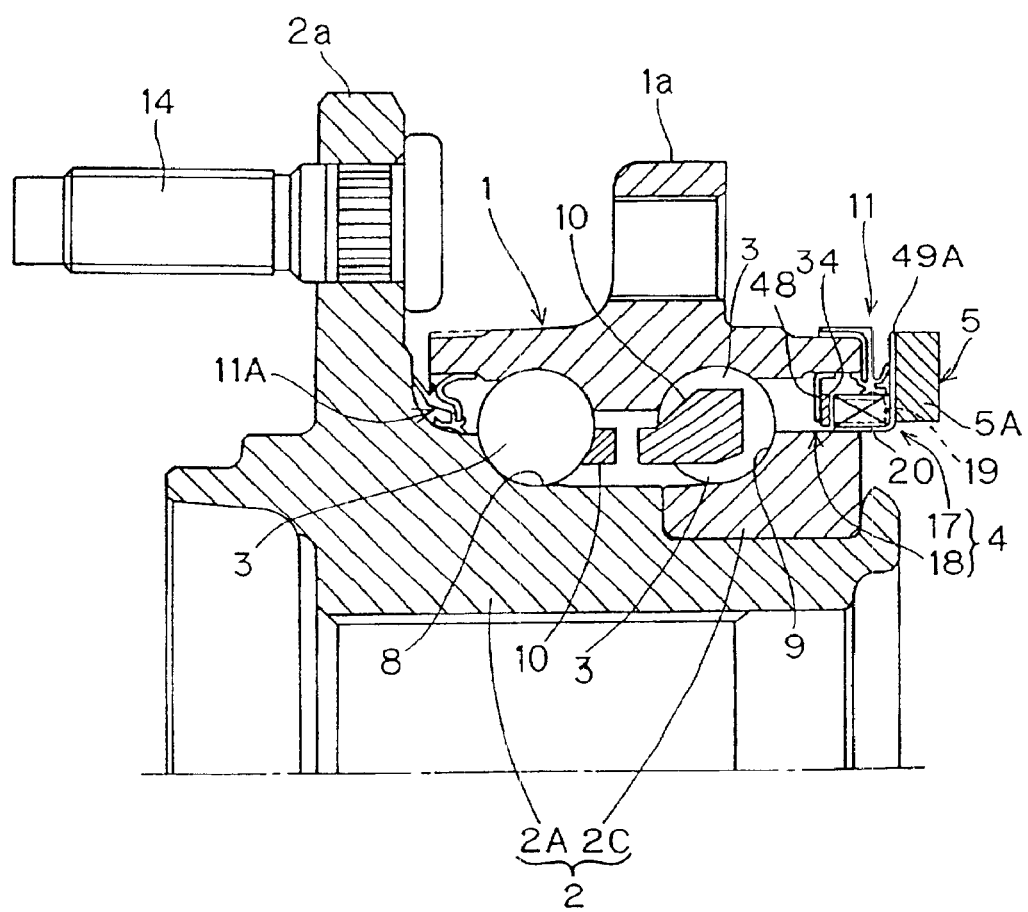
FIG. 18 is a fragmentary sectional view of the wheel support bearing assembly according to a twelfth preferred embodiment of the present invention, showing only one of longitudinal halves thereof.

FIG. 18 illustrates a twelfth embodiment of the present invention. The wheel support bearing assembly according to this embodiment is the inner race rotating type of a third generation and is used for the support of the drive axle. The electric generator 4 used therein which serves as the rotation sensor is the thrust type.

The outer member 1 is of one piece structure including the vehicle body fitting flange 1a. The inner member 2 includes a hub wheel 2A and a separate inner race forming member 2B mounted on an outer periphery of one end of the wheel hub 2A.

FIG. 19 illustrates a thirteenth embodiment of the present invention. The wheel support bearing assembly used in this embodiment is the inner race rotating type of a first generation, wherein the electric generator 4 serving as the rotation sensor is the radial type.

In this embodiment as well as the embodiments that follow, two components, that is, an assembly A, comprised of the transmitter 5A and the ring member 19, and an assembly B comprised of the multi-pole magnet 18 and the sealing member 45B are utilized to seal the open end between the outer member 1 and the inner member 2.

In the thirteenth embodiment shown in FIG. 19, the outer member 1 serves as a fixed side member and is made up of a single bearing outer race. On the other hand, the inner member 2 serves as a rotating side member and is made up of two bearing inner races 2D arranged axially. The outer member 1 and the inner member 2 do not have any wheel mounting flange and any vehicle body fitting flange.

The transmitting means 5 is in the form of an annular transmitter 5A. This transmitter 5A is integrated together with the ring member 19 of the coil/magnetic element combination 17 by securing it to the fitting ring 49B that is common to the coil/magnetic element combination 17 forming a part of the electric generator 4. The integrity so defined in this way serves as the assembly A on a side adjacent the coil. The sealing member 11 for sealing the open end includes a sealing member 45B to which the multi-pole magnet 18 of the electric generator 4 is fitted. The sealing member 45B includes a sealing core metal 47B and an elastic member 46B with the elastic member 46B held in sliding contact with the fitting ring 49B. The sealing member 45B and the multi-pole magnet 18 altogether constitute the assembly B. The ring member 19 of the coil/magnetic element combination 17 is fitted to an outer peripheral surface of one end portion of the inner member 2 through the fitting ring 49B, and the end of the outer member 1 is located at a potion retracted axially inwardly of the inner member 2 towards an intermediate portion of the bearing assembly a distance about equal to the width of the coil/magnetic element combination 17.

The mounting ring 49B includes a first cylindrical portion 49Ba having one end portion formed with a first upright plate portion 49Bb extending radially outwardly, a second cylindrical portion 49Bc, and a second upright plate portion 49Bd extending radially outwardly therefrom. The coil/magnetic element combination 17 is fitted to the mounting ring 49B with the ring member 19 mounted on the outer peripheral surface of the first cylindrical portion 49Ba of the mounting ring 49B and held in contact with the first upright plate portion 49Bb. The annular transmitter 5A is fitted to an outer side face of the second upright plate portion 49Bb of the fitting ring 49B. The mounting ring 49B is press-fitted into the outer peripheral surface of the end of the inner member 2 with the first cylindrical portion 49Ba.

The sealing core metal 47B is of a shape including a first cylindrical portion 47Ba having one end formed with a first upright plate portion 47Bb extending radially inwardly, a second cylindrical portion 47Bc and a second upright plate portion 47Bd extending radially inwardly therefrom. This sealing core metal 47B is fitted in position with the first cylindrical portion 47Ba press-fitted into the outer peripheral surface of the end of the outer member 1. The elastic member 46B includes a plurality of lips 46Ba to 46Bc slidingly engaged with the second cylindrical portion 49Bc and the second upright plate portion 48Bd of the fitting ring 49B.

Although as is the case with that in the first embodiment shown in FIGS. 1 to 5 the electric generator 4 is the radial type, contrary to the first embodiment the multi-pole magnet 18 is positioned on the side of the outer periphery whereas the coil/magnetic element combination 17 is positioned on the side of the inner periphery.

The multi-pole magnet 18 includes a cylindrical substrate 48C and the magnet member 34 and is press fitted into an inner peripheral surface of the second cylindrical portion 47Bc of the sealing core metal 47B. The magnet metal 34 is substantially the same as the magnet member 34 shown in and described with reference to FIG. 3, except that it is fixedly secured to the cylindrical substrate 48C as described above.

The coil/magnetic element combination 17 is made up of the ring member 19 made of a magnetic material and accommodating the coil 20. The ring member 19 is substantially the same as the ring member 19 of the coil/magnetic element combination 17 which has been described in connection with the first embodiment (FIG. 1) with reference to FIGS. 4 and 5, except that the orientation of magnetic polarity is different. In other words, the ring member 19 shown in the example of FIG. 19 has a sectional shape which is groove-shaped as is the case with the ring member 19 used in the example of FIGS. 4 and 5 and includes a plurality of interleaved claws 21a and 22a bent from open edges of the side faces of the groove in respective directions opposed to each other and alternating in a direction circumferentially thereof. It is, however, to be noted that the coil/magnetic element combination 17 used in the embodiment of FIG. 19 is, unlike that in the example shown in FIGS. 4 and 5, has its groove opening oriented in a direction radially outwardly with respective magnetic poles defined by the interleaved claws 21a and 22a oriented radially outwardly. Even in the ring member 19 used in the example shown in FIG. 19, the interleaved claws 21a and 22a may be tapered as is the case with the example shown in FIG. 6.

In the structure described above, since the sealing member 11 and the electric generator 4 and the transmitting means 5 are constituted by the two assemblies, the number of component parts is small and assemblability is excellent.

Figure 20:
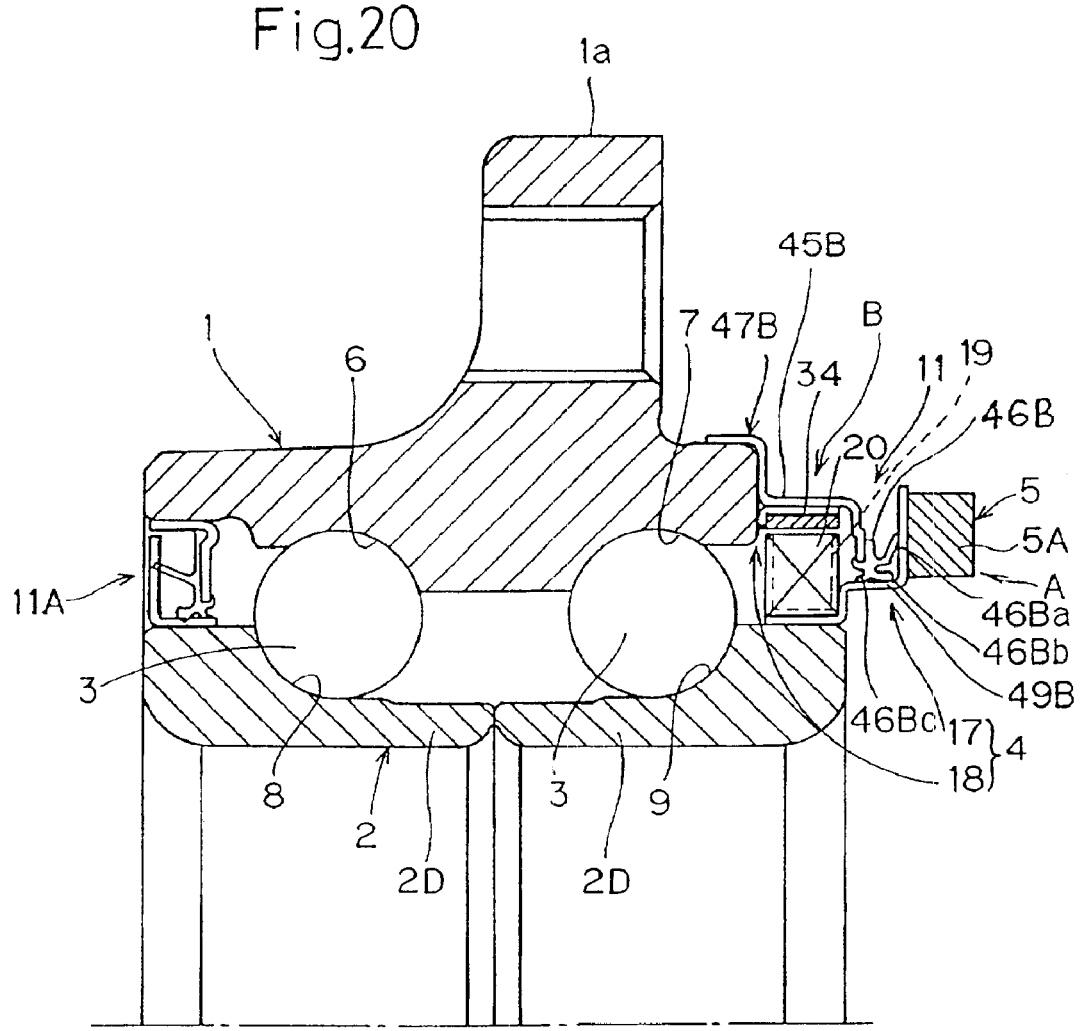
FIG. 20 is a fragmentary longitudinal sectional view of the wheel support bearing assembly according to a fourteenth preferred embodiment of the present invention, showing only one of longitudinal halves thereof.

FIG. 20 illustrates a fourteenth embodiment of the present invention which is directed to the wheel support bearing assembly of the inner race rotating type of a second generation. In this wheel support bearing assembly, the electric generator 4 which serves as the rotation sensor is the radial type.

The outer member 1 is of one piece structure including the wheel fitting flange 1a on the outer periphery thereof. The inner member 2 includes two bearing inner races 2D arranged axially.

The sealing member 11, the electric generator 4 and the transmitting means 5 are substantially the same as those used in the thirteenth embodiment described with reference to FIG. 19 and are constituted by the two assemblies A and B.

Figure 21:
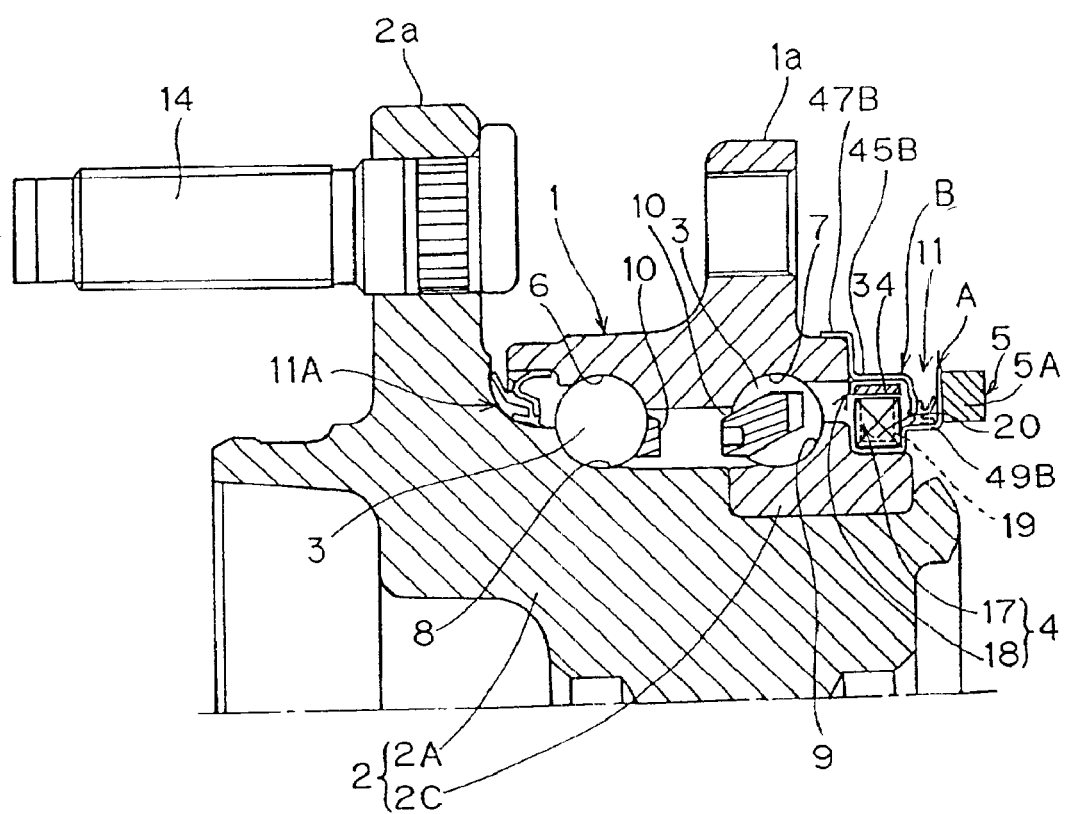
FIG. 21 is a fragmentary longitudinal sectional view of the wheel support bearing assembly according to a fifteenth preferred embodiment of the present invention, showing only one of longitudinal halves thereof.

FIG. 21 illustrates a fifteenth embodiment of the present invention which is directed to the wheel support bearing assembly for the support of a driven axle. This wheel support bearing assembly is the inner race rotating type of a third generation and the electric generator 4 serving as the rotation sensor is the radial type.

The outer member 1 is of one piece structure including the vehicle body fitting flange 1a. The inner member 2 is constituted by the hub wheel 2A and the separate inner race forming member 2C mounted on the outer periphery of the end of the hub wheel 2A. The inner race forming member 2C is fixed in position by fastening a fastening portion, provided in the hub wheel 2A, to connect it to the hub wheel 2A axially. The inner member 2 is a non-perforated member having no inner bore and has the wheel mounting flange 2a at one end thereof.

The sealing member 11, the electric generator 4 and the transmitting means 5 are substantially the same as those used in the thirteenth embodiment shown in FIG. 19 and are constituted by the two assemblies A and B.

Figure 22:
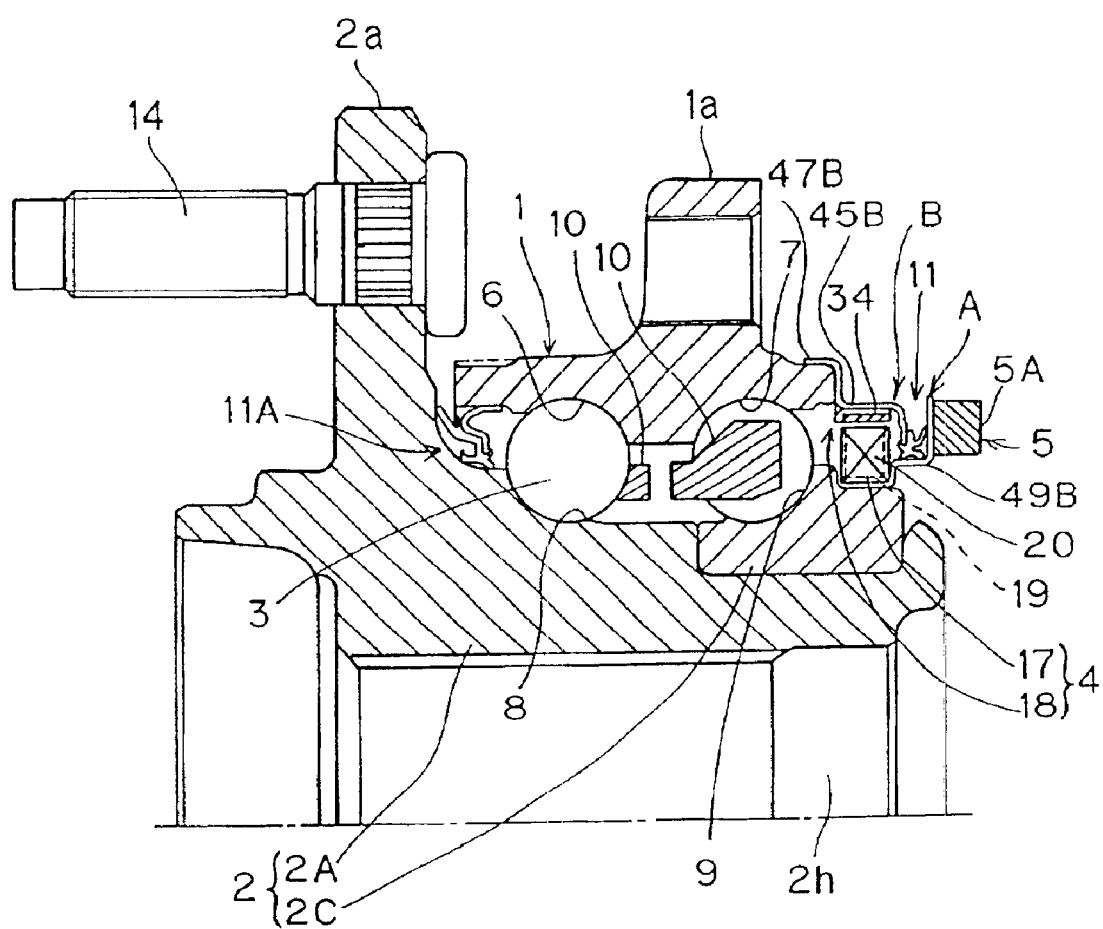
FIG. 22 is a fragmentary longitudinal sectional view of the wheel support bearing assembly according to a sixteenth preferred embodiment of the present invention, showing only one of longitudinal halves thereof.

FIG. 22 illustrates a sixteenth embodiment of the present invention. The wheel support bearing assembly according to this embodiment is for the support of a drive axle and is the inner race rotating type of a third generation. The electric generator 4 that serves as the rotation sensor is the radial type.

In this embodiment, the inner member 2 has an inner diametric hole 2h. Other structural features thereof are substantially similar to those in the fifteenth embodiment shown in FIG. 21.

Figure 23:
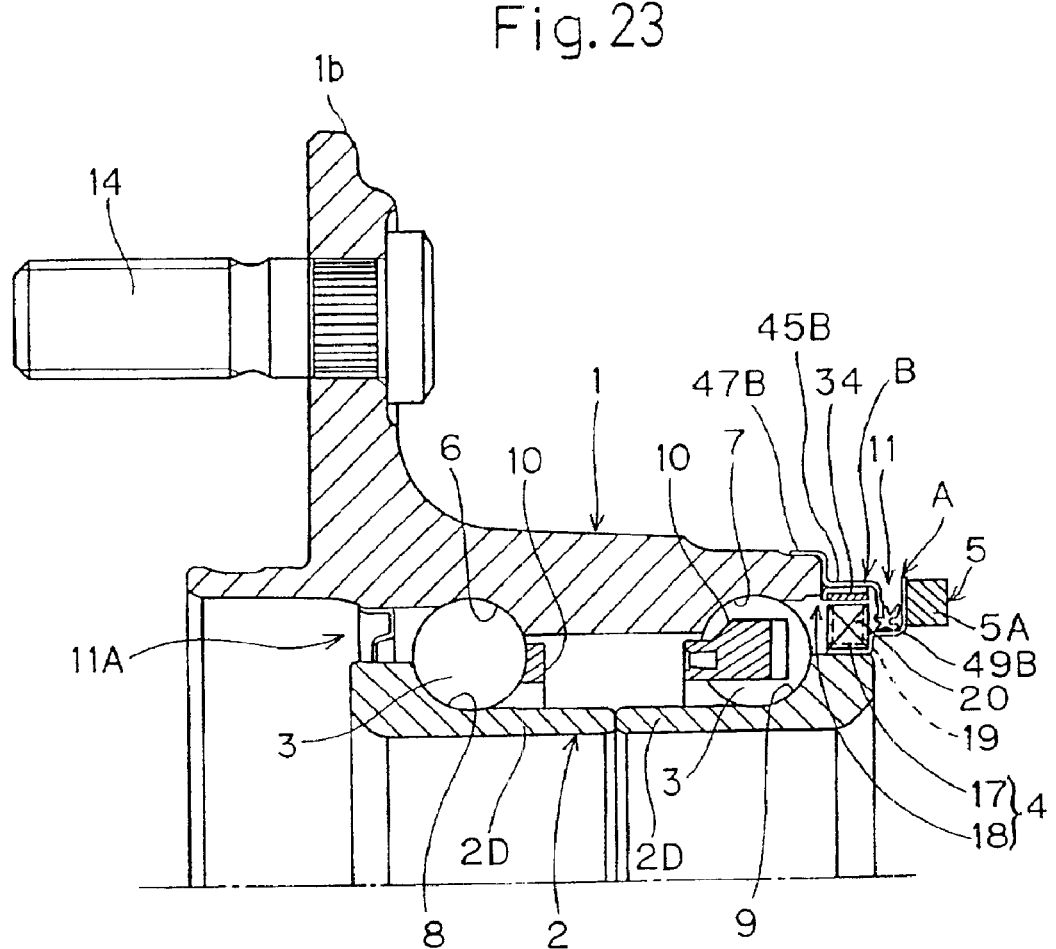
FIG. 23 is a fragmentary longitudinal sectional view of the wheel support bearing assembly according to a seventeenth preferred embodiment of the present invention, showing only one of longitudinal halves thereof.

FIG. 23 illustrates a seventeenth embodiment of the present invention. The wheel support bearing assembly according to this seventeenth embodiment is the outer race rotating type of a second generation and the electric generator 4 that serves as the rotation sensor is the radial type.

The outer member 1 is of one piece structure including the wheel fitting flange 1a on the outer periphery thereof. The inner member 2 includes the two bearing inner races 2D arranged axially thereof.

The sealing member 11, the electric generator 4 and the transmitting means 5 are substantially similar to those in the thirteenth embodiment shown in FIG. 19 and are constituted by the two assemblies A and B.

Figure 24:
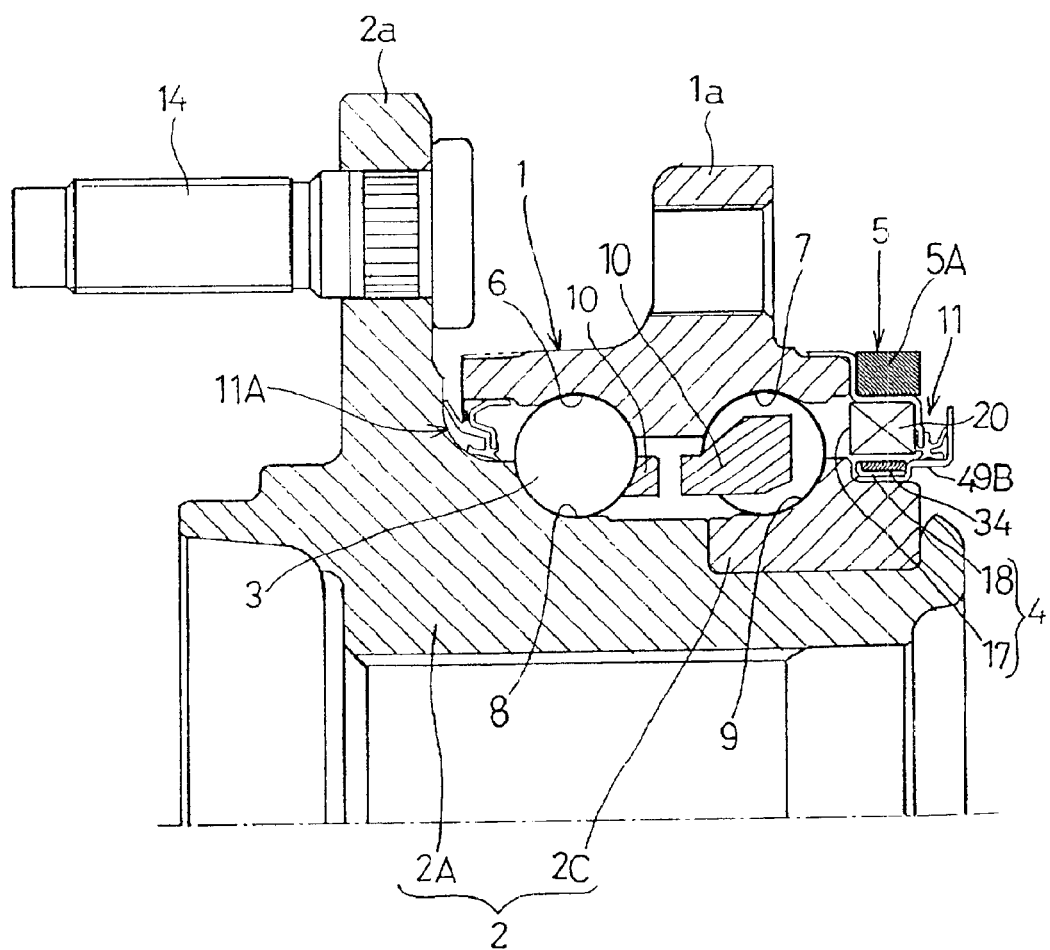
FIG. 24 is a fragmentary longitudinal sectional view of the wheel support bearing assembly according to an eighteenth preferred embodiment of the present invention, showing only one of longitudinal halves thereof.

FIG. 24 illustrates an eighteenth embodiment of the present invention. The wheel support bearing assembly shown therein is substantially similar to that according to the sixteenth embodiment shown in and described with reference to FIG. 22, except that the following structural features are added to the wheel support bearing assembly of FIG. 24. More specifically, the multi-pole magnet 18 and the coil/ magnetic element combination 17 of the electric generator 4 are positioned radially inwardly and radially outwardly relative to each other, respectively. The transmitter 5A used therein is of an annular configuration and is positioned radially outwardly of the electric generator 4.

In this structure, since the annular transmitter 5A is used and positioned radially outwardly of the electric generator 4, the transmitter does not protrude axially of the wheel support bearing assembly such as observed in the sixteenth embodiment shown in FIG. 22 and, therefore, utilization of the space axially adjacent the wheel support bearing assembly can advantageously be maximized particularly where the constant speed universal joint is positioned closely to the wheel support bearing assembly. Also, any wiring between the transmitter 5A and the electric generator 4 can also be dispensed with.

Figure 25A:
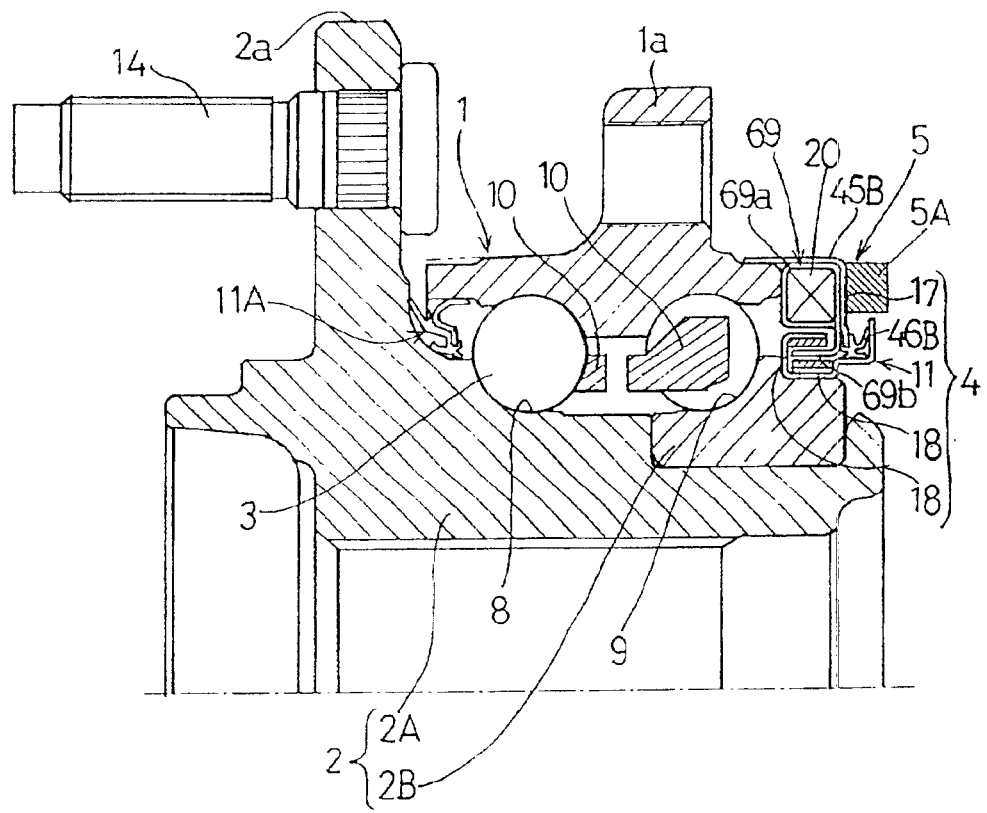
FIG. 25A is a fragmentary longitudinal sectional view of the wheel support bearing assembly according to a nineteenth preferred embodiment of the present invention, showing only one of longitudinal halves thereof.
Figure 25B:
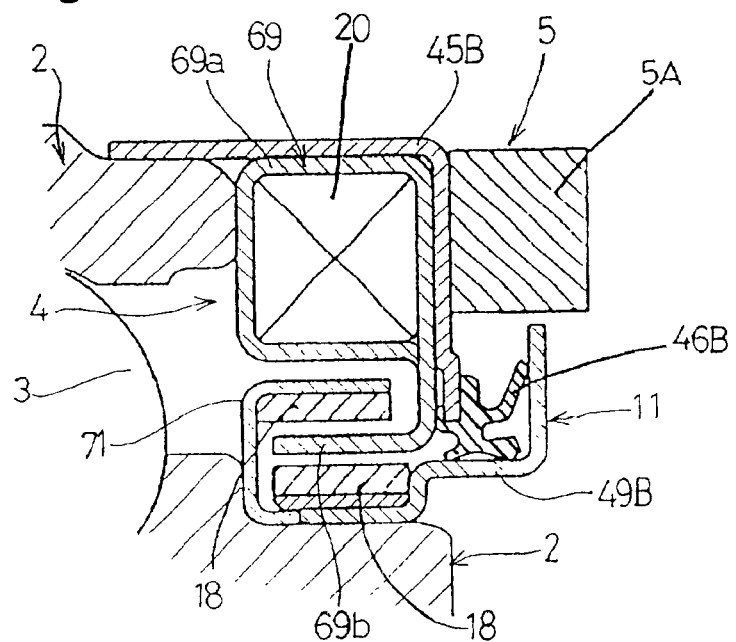
FIG. 25B is a fragmentary enlarged sectional view of a portion of the wheel support bearing assembly shown in FIG. 25A.
Figure 26:
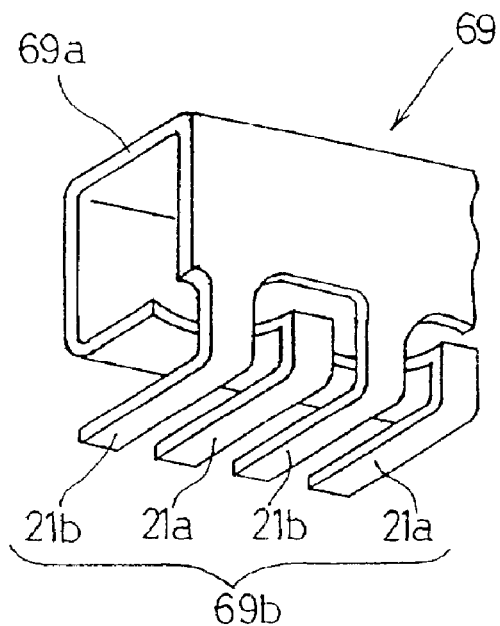
FIG. 26 is a fragmentary perspective view of a ring member employed in the wheel support bearing assembly shown in FIG. 25A.
Figure 27:
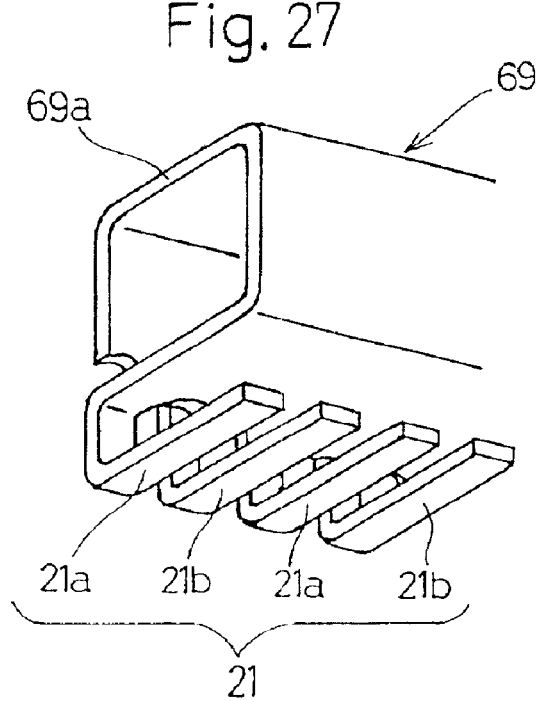
FIG. 27 is a fragmentary perspective view of the ring member shown in FIG. 26, as viewed in a direction opposite to that viewed in FIG. 26.

FIGS. 25 to 27 illustrates a nineteenth embodiment of the present invention. According to this embodiment, the electric generator 4 has the following structural features. More specifically, in this embodiment, a pair of multi-pole magnets 18 and 18 are employed in combination with a ring member 69. As best shown in FIG. 25B, the ring member 69 includes a casing portion 69a and a magnetic pole portion 69b positioned radially inwardly of the casing portion 69a. While the coil 20 of the electric generator 4 is accommodated within the casing portion 69a of the ring member 69, those multi-pole magnets 18 and 18 are positioned on respective sides of the magnetic pole portion 69b extending axially inwardly of the annular space between the inner and outer members 2 and 1, with the multi-pole magnets 18 and 18 consequently disposed one inside the other with respect to the radial direction. The ring member 69 of the structure described above is fitted to the outer member 1 whereas the multi-pole magnets 18 and 18 are secured to a common annular carrier 71 so as to assume respective positions on the sides of the magnetic pole portion 69b, said annular carrier 71 being in turn mounted on the inner member 2. It is to be noted that the annular carrier 71 which has been described as carrying the multi-pole magnets 18 and 18 and as mounted directly on the inner member 2 may alternatively employed for each of the multi-pole magnets 18 and 18 and may be mounted on the inner member 2 through the mounting ring 49B.

The casing portion 69a of the ring member 69, in which the coil 20 is accommodated therein represents a generally C-shaped section, and as best shown in FIGS. 26 and 27, has neighboring side edges each having a plurality of prongs 21a or 21b formed integrally therewith. FIGS. 26 and 27 are views of the ring member 69 as viewed from different angles, respectively. The prongs 21a integral with the lower side edge of the casing portion 69a extend from an inner periphery of the casing portion 69a. Those prongs 21a and 21b are, as is the case with the ring member 19 shown in, for example, FIG. 5, FIG. 6, interleaved with each other so as to define alternating magnetic poles. The interleaved arrangement of those prongs 21a and 21b in a direction circumferential of the ring member 69 constitutes the magnetic pole portion 69b referred to above. The whole of the ring member 69 is made of magnetic material.

The wheel support bearing assembly according to this embodiment shown in FIG. 25 to 27 are, except for the electric generator 4, similar to the wheel support bearing assembly according to the sixteenth embodiment shown in and described with reference to FIG. 22, in which the transmitter 5A is positioned radially outwardly of the electric generator 4 and is mounted on a mounting ring 45B.

In the case of this embodiment, since the multi-pole magnets 18 and 18 are positioned on the respective sides of the magnetic pole portion 69b of the ring member 69 carrying the coil 20, the surface area confronting the multi-pole magnets 18 and 18 can be increased without altering the surface area of the magnetic pole portion 69b including the prongs 21a and 21b. Accordingly, the magnetic fluxes interlinking with the coil 20 can be increased to thereby increase the power output of the electric generator 4. By way of example, as compared with the use of the single multi-pole magnet 18, the quantity of the magnetic fluxes that is twice that obtained with the single multi-pole magnet 18 can be secured and, hence, the power output correspondingly increase twofold.

Since the space for installation of the electric generator 4 employed in this type of the wheel support bearing assembly is severely limited, it is considered feasible to use the electric generator of a compact size, but capable of providing an increased power output. In particular, in the case of a small diameter bearing, for a given transverse sectional surface area of the coil 20 of the electric generator 4 (i.e., without the number of turns of the coil 5 being changed), a problem has been recognized in that the total surface of the multi-pole magnet 18 can be reduced and the electric power output is correspondingly reduced.

In order to increase the electric power output of the generator, one or a combination of four factors, i.e., increase of the magnetic force, reduction of the gap, increase of the number of turns of the coil (increase of the capacity) and increase of the magnet-to-magnet surface area, can be contemplated. Of them, increase of the magnetic force is limited in view of material, reduction of the gap is difficult to achieve because of a precision, and increase of the number of turns of the coil is incompatible with compactization.

However, according to the nineteenth embodiment discussed above, since the two multi-pole magnets 18 and 18 are positioned on the respective sides of the same magnetic pole portion 96b, it is possible to increase interlinking magnetic fluxes without altering the capacity of and the magnetic force produced by the coil 20 of the electric generator 4, and hence to increase the power output of the electric generator 4. Although the two multi-pole magnets 18 and 18 are employed, as compared with increase of the coil capacity, it is possible to easily achieve compactization. Where the ring member 69 that serves as a yoke is so configured and so shaped as to define the generally C-sectioned casing portion 69a and the magnetic pole portion 69b extending therefrom such as shown in FIGS. 26 and 27, the assembly including the ring member 69 and the two multi-pole magnets 18A and 18B can be snugly and neatly accommodated and the total capacity of the electric generator 4 and the multi-pole magnets 18 and 18 can advantageously be reduced, making it possible for the system as a whole to be assembled compact.

Also, the structure in which the multi-pole magnets 18 and 18 are positioned on the respective sides of the magnetic pole portion 69b such as in the nineteenth embodiment is particularly advantageous in that even though the magnetic pole portion 69b is radially displaced during assemblage or rotation, the sum of the magnetic gaps between one multi-pole magnet 18 and the magnetic pole portion 69b and between the other multi-pole magnet 18 and the magnetic pole portion 69b does not vary and, accordingly, the influence which such variation would be brought upon the power generating performance is minimal as compared with that occurring where only one multi-pole magnet 18 is employed.

In the foregoing embodiment described with reference to FIGS. 25 to 27, the ring member 69 carrying the coil 20 and the multi-pole magnets 18 and 18 have been shown and described as mounted on the outer and inner members 1 and 2, respectively. However, they may be reversed in position relative to each other, that is, the ring member 69 and the multi-pole magnets 18 and 18 may be mounted on the inner and outer members 2 and 1, respectively. In such alternative case, either of the outer and inner members 1 and 2 may be a rotating side. In addition, the nineteenth embodiment has been described as applied to the wheel support bearing assembly of the third generation used to support the drive axle, but the arrangement in which the multi-pole magnets 18 and 18 are positioned on the respective sides of the magnetic pole portion 69b can be applied to any type of the wheel support bearing assembly regardless of the generation and also regardless of whether it is used in association with the drive axle or whether it is used in association with the driven axle.

Figure 28:
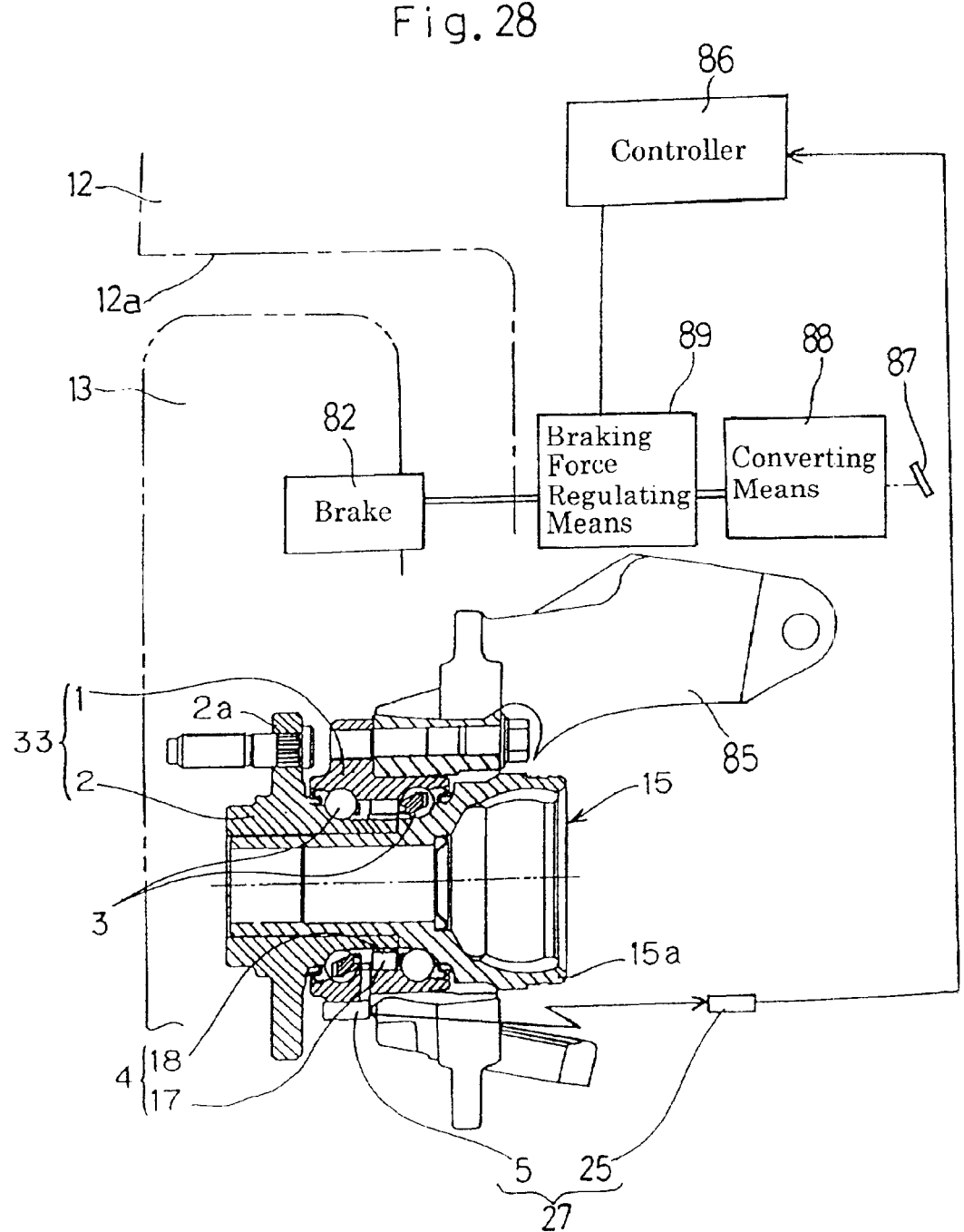
FIG. 28 is a schematic diagram showing a conceptual construction of an anti-skid brake device employing the wheel support bearing assembly of the present invention shown in combination with a control system therefore.

Hereinafter, application of any one of the wheel support bearing assemblies of the foregoing embodiments to an anti-skid brake system will be described with particular reference to FIGS. 28 to 34. It is, however, to be noted that although the anti-skid brake device can work satisfactorily with the wheel support bearing assembly of any of the previously described embodiments, the following description proceeds with the wheel support bearing assembly of the first embodiment (FIG. 1) as applied to the anti-skid brake device. The anti-skid brake device as shown in FIG. 28 is an apparatus wherein the braking force of a brake 82 is controlled by detecting the number of revolution of wheels 13 with the use of the wheel support bearing assembly of FIG. 1 and in response to a detection signal thereof. Each wheel 13 is rotatably supported by the automotive body structure 12 through the wheel support bearing assembly 33. The wheel support bearing assembly 33 employed is in the form of the wheel support bearing assembly described with reference to and shown in FIGS. 1 to 6 in connection with the first embodiment of the present invention, and is of the design in which the rolling elements 3 are interposed between a wheel support member 1, which serves as the outer member, and a rotary member 2 which serves as the inner member. The wheel support member 1 includes a bearing member of stationary side, and the rotary member 2 includes a bearing member of rotary side. The wheel support member 1 is supported by a suspension system (not shown), protruding downwardly from the automobile body structure 12, through a knuckle 85. The rotary member 2 includes the wheel mounting flange 2a formed on an outer periphery of one end thereof, to which the wheel 13 is fitted. The wheel 13 is, so far shown therein, a front (steering) wheel, and the rotary member 2 of the wheel support bearing assembly 33 has the opposite end connected to an axle (not shown) through the constant speed universal joint 15. This rotary member 2 includes an integral part which defines the outer race of the constant speed universal joint 15.

A pulsar ring 18 which is mounted on the rotary member 2, and a sensor 17 is mounted on the wheel support member 1 in opposition to the pulsar ring 18. The pulsar ring 18 and the sensor 17 altogether constitute the electric generator 4 and define the rotor and the stator of the electric generator 4, respectively. Each part of this embodiment is the same structure as shown in FIGS. 1 to 5. The detection signal from the sensor 17 is supplied through a wireless transmitting means 27 to a controller 86. The controller 86 is a means for controlling the braking force of the brake 82. The wireless transmitting means 27 includes a transmitting means (a transmitting unit) 5 electrically connected with the sensor 17 through a connector 41 and mounted on a portion of the outer periphery of the wheel support member 1, and a receiving means (a receiving unit) 25 mounted on the automobile body structure 12. The receiving means 25 is installed within, for example; a tire housing 12a defined in the automobile body structure 12.

The brake 82 is used to brake the wheel 13 by engagement with a frictional member (not shown) such as, for example, a brake drum or a brake disc provided on the wheel 13 and includes a hydraulic cylinder or the like. Operation of a brake operating member 87 such as, for example, a brake pedal is converted into a hydraulic pressure by means of a converting means 88 and is then transmitted to the brake 82 after having increased in pressure.

A braking force regulating means 89 is a means for regulating the braking force of the brake 82 and regulates the braking force according to a command from the controller 86. The braking force regulating means 89 is provided on a hydraulic circuit at a location between the brake 82 and the converting means 88.

The controller 86 is, more specifically, a means for applying a braking force regulating command to the braking force regulating means 89 according to the number of wheel revolutions detected by the rotation sensor 17. As a parameter indicative of the number of revolutions of the wheel detected by the sensor 17, a sensor signal outputted from the receiving unit 25 of the wireless transmitting means 27 is utilized. As will be described later, the receiving unit 25 is used to detect not only the sensor signal, but also a radio field strength signal indicative of the strength of radio waves, and the controller 86 is operable to determine control of the braking force in dependence on the sensor signal and the radio field strength signal. This controller 86 includes a computer such as, for example, a microcomputer, and a computer executable program (not shown) executed by the computer. This computer executable program describes an algorithm for determining the control of the braking force in dependence on the sensor signal and the radio field strength signal. The controller 86 may be constituted by an electronic circuit in which control procedures are set up.

Figure 29:
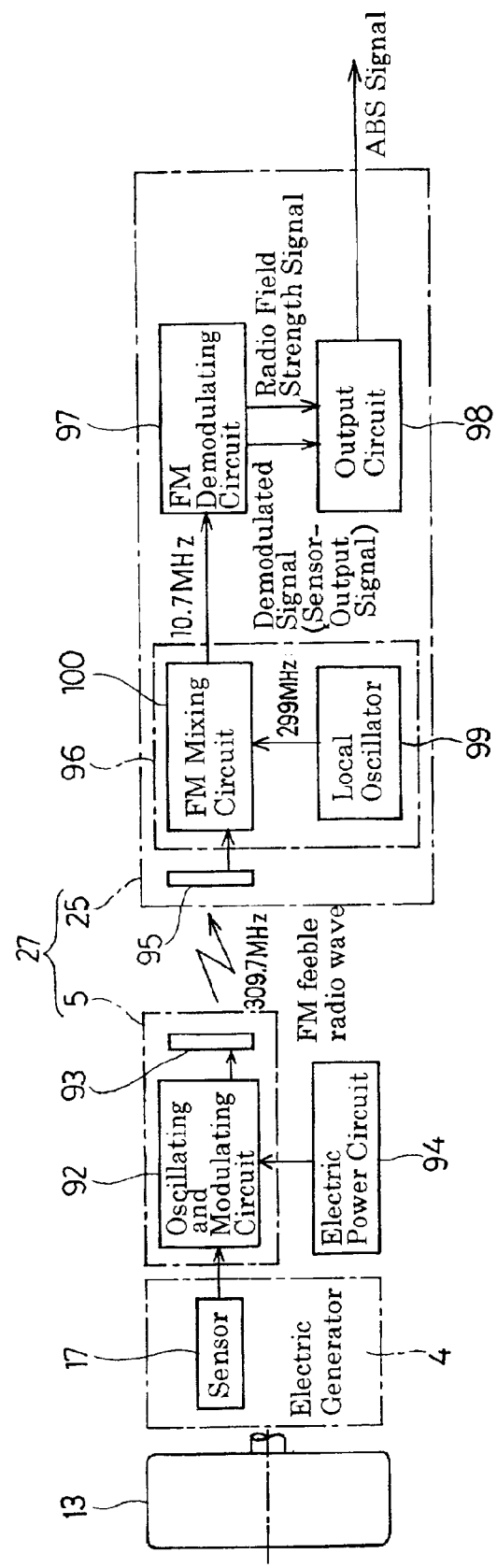
FIG. 29 is a block circuit diagram showing a wireless transmission system employed in the practice of the present invention.

FIG. 29 illustrates a block circuit diagram of the wireless transmitting means 27. The wireless transmitting means 27 is operable with feeble radio waves and employs a frequency modulation (FM) system. The transmitter 5 is so designed to modulate a carrier wave based on the sensor output signal from the sensor 17 and to transmit a feeble radio wave and includes an oscillating and modulating circuit 92 and a transmitting antenna 93. The oscillating and modulating circuit 92 includes an oscillator for oscillating a carrier wave of a predetermined frequency and a modulator for modulating the carrier wave from the oscillator with the sensor output signal from the sensor 17. This oscillating and modulating circuit 92 is electrically powered by an electric power source 94 utilizing the electric power generated by the electric generator 4 also serving as a dynamo type rotation sensor.

A receiving unit 25 includes a receiver antenna 95, a tuning circuit 96 for tuning to the received signal, a demodulating circuit 97 for demodulating the received and tuned signal, and an output circuit 98 for performing a predetermined process on the output from the demodulating circuit 97 and also for outputting a signal (ABS signal) to be supplied to the controller 86 shown in FIG. 28. More specifically, the tuning circuit 96 is operable to tune the received signal and then to convert the received signal into an intermediate frequency signal, and the demodulating circuit 97 is employed in the form of an frequency demodulating circuit operable to demodulate the intermediate frequency signal. The tuning circuit 96 includes a local oscillator 99 for generating a local oscillation signal of a predetermined frequency, and an FM mixing circuit 100 for mixing the received signal and the local oscillation signal to provide the intermediate frequency signal. The demodulating circuit 97 is operable to output a radio field strength signal indicative of the strength of the radio field of the received signal along with an operation to output the demodulated signal corresponding to the sensor output signal from the sensor 17. Both of those signals are inputted to the output circuit 98. The demodulated signal is in the form of a frequency modulated pulse signal.

The output circuit 98 is operable, as the predetermined process, to output a duplex signal in which the sensor output signal, that is, the demodulated signal outputted from the demodulating circuit 97, and the radio field strength signal are duplexed together. This duplex signal is hereinafter referred to as an ABS signal. The duplexing is a process of synthesizing a signal added with a direct current offset by the radio field strength signal to the sensor output signal, that is, the demodulated signal. The duplex signal, that is, the ABS signal is of a kind from which contents of the signal can be detected in terms of the voltage.

The ABS signal outputted from the output circuit 98 can be available in one of the following three forms:

(1) When the demodulated signal (pulse signal) appears and the radio field strength signal indicates the strong radio field strength.

This signal form is generated during a normal operation.

(2) When the radio field strength signal indicates the feeble radio field strength (or the zero radio field strength) regardless of the presence or absence of the demodulated signal (pulse signal).

This signal form is generated when the transmitter is abnormal or halted, or when an unstable operation takes place as a result of lack of a sufficient operating electric power.

(3) When the demodulated signal (pulse signal) does not appear and the radio field strength signal indicates the strong radio field strength.

This signal form is generated when jamming radio waves are present.

Referring to FIG. 28, the controller 86 determines a control of the braking force in dependence on the sensor output signal and the radio field strength signal both outputted from the receiving unit 25 and apply a control command appropriate to a result of determination to the braking force regulating means 89. By way of example, the controller 86 is operable to control not to perform an anti-skid braking operation in dependence on the sensor output signal and the radio field strength signal in the event that no predetermined condition is satisfied. The predetermined condition referred to above is such that a normal operation is determined in reference to the sensor output signal and the radio field strength signal. The condition required to determine the occurrence of the normal operation is determined is satisfied when the demodulated signal appears and the radio field strength signal indicates the strong radio field strength.

In the event that the sensor output signal and the radio field strength signal both outputted from the receiving unit 25 are represented by the duplex signal referred to above, the controller 86 responds to the duplex signal to determine a control of the braking force appropriate to the sensor output signal and the radio field strength signal.

Where the receiving unit 25 is constructed as discussed with reference to FIG. 29, the ABS signal of one of the forms (1) to (3) discussed above is outputted from the receiving unit 25 as the duplex signal in which the sensor output signal and the radio field strength signal are duplexed. In such case, the predetermined condition required to determine whether or not the anti-skid braking operation is carried out is when the demodulated signal appears and the radio field strength signal indicates the strong radio field strength, as mentioned under item (1) above. Where regardless of the presence or absence of the demodulated signal, the radio field strength signal indicates the feeble radio field strength as mentioned under item (2) above, and where the demodulated signal (pulse signal) does not appear and the radio field strength signal indicates the strong radio field strength as mentioned under item (3) above, no anti-skid braking operation is performed. Determination of the condition in which the demodulated signal appears and the radio field strength signal indicates the strong radio field strength as mentioned under item (1) above can take place, for example, when as can be understood from the waveforms shown in, and as will be described with reference to, FIGS. 30, 32 and 34, the duplex signal (the ABS signal) indicates a voltage in a higher region than a predetermined voltage.

Figure 31:
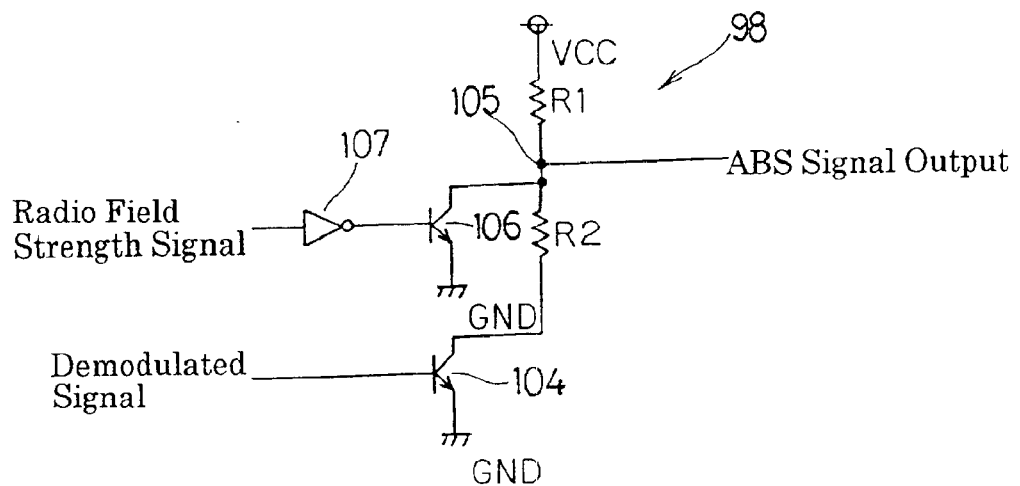
FIG. 31 is a circuit diagram showing an example of an output circuit employed in the wireless transmission system shown in FIG. 29.
Figure 32:
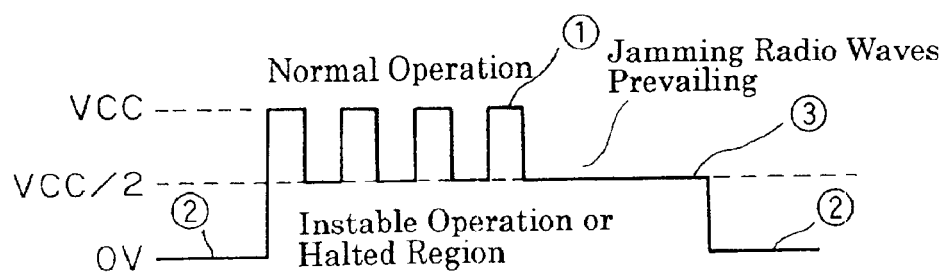
FIG. 32 is a chart showing a waveform appearing in the circuit shown in FIG. 31.

FIG. 31 illustrates an exemplary circuit construction of the output circuit 98 discussed above. This output circuit 98 includes a series circuit of two series-connected voltage dividing resistors R1 and R2, which is interposed between a power source terminal VCC and a ground terminal GND, and a switching transistor 104 with the base of the switching transistor 104 adapted to receive the demodulated signal. Another switching transistor 106 is connected between a junction 105 of the series-connected resistors R1 and R2 and the ground terminal GND and has its base adapted to be applied with the radio field strength signal through an inverter 107. The ABS signal, which is the duplex signal, is outputted from the junction 105.

Where the output circuit 98 is constructed as shown in FIG. 31, the output from this output circuit 98 represents such a waveform as shown in FIG. 32 depending on one of the previously discussed conditions for the demodulated signal and the radio field strength signal.

Specifically, in the event of the condition (1) (when the demodulated signal appears and the radio field strength signal indicates the strong radio field strength), the radio field strength signal assumes a HIGH level, which is in turn inverted by an inverter 107 and is then applied to the base of the transistor 106, and therefore, the transistor 106 is switched off. Also, the demodulated signal corresponding to the detection signal from the sensor 17 represents a pulse signal in which HIGH and LOW levels are alternately repeated. Since this demodulated signal is applied to the base of the transistor 104, the transistor 104 is alternately switched on and off. Accordingly, the waveform of the output from the output circuit 98 outputted during this condition (1) is such as indicated by a region (1) in FIG. 32.

In the event of the condition (2) (when the radio field strength signal indicates the feeble radio field strength regardless of the presence or absence of the demodulated signal), the radio field strength signal assumes a LOW level and is, after having been inverted by the inverter 107, applied to the base of the transistor 106. Accordingly, the transistor 106 is switched on and, hence, the output from the output circuit 98 during this condition (2) represents 0V as indicated by (2) in FIG. 32.

In the event of the condition (3) (when the demodulated signal does not appear and the radio field strength signal indicates the strong radio field strength), the radio field strength signal assumes a HIGH level and the transistor 106 is correspondingly switched off. However, since no demodulated signal is applied to the transistor 104 associated with the demodulated signal, the transistor 106 is held in a conducting state and, accordingly, the output from the output circuit 98 during this condition (3) represents a constant voltage level as shown by (3) in FIG. 32.

Figure 33:
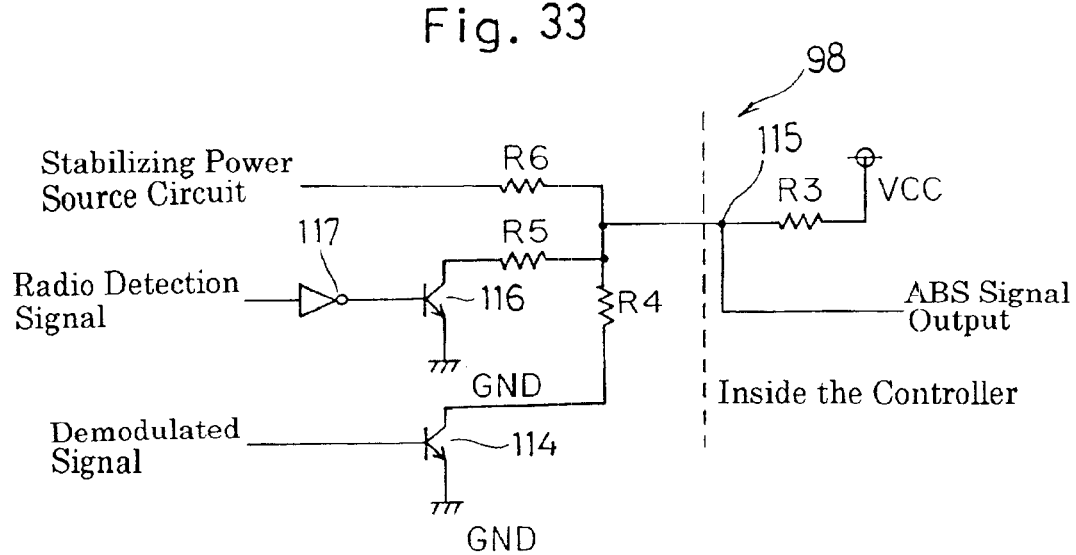
FIG. 33 is a circuit diagram showing another example of the output circuit that can be employed in the wireless transmission system shown in FIG. 29.

The output circuit 98 discussed above may have an alternative circuit construction such as shown in FIG. 33. In this alternative example, supply of the electric power and that of the output signal are carried out by means of a single line. Specifically, the output circuit 98 includes a series connected circuit of voltage dividing resistors R3 and R4, which is connected between the power terminal VCC in the controller 86 and the ground terminal GDN in the receiving unit 25, and a switching transistor 114 with the base of the transistor 114 adapted to be applied with the demodulated signal. Another transistor 116 and a resistor R5 are connected between a junction 115 of the resistors R3 and R4 and the ground terminal GDN, with the base of the transistor 116 adapted to be applied with the radio field strength signal through the inverter 117. It is to be noted that one R3 of the resistors R3 and R4 is provided in the controller 86 so that on a side of the controller 86, the ABS signal can be outputted from the junction 115. On the side of the output circuit 98, the junction 115 is also connected with a stabilizing power circuit through a resistor R6.

Figure 34:
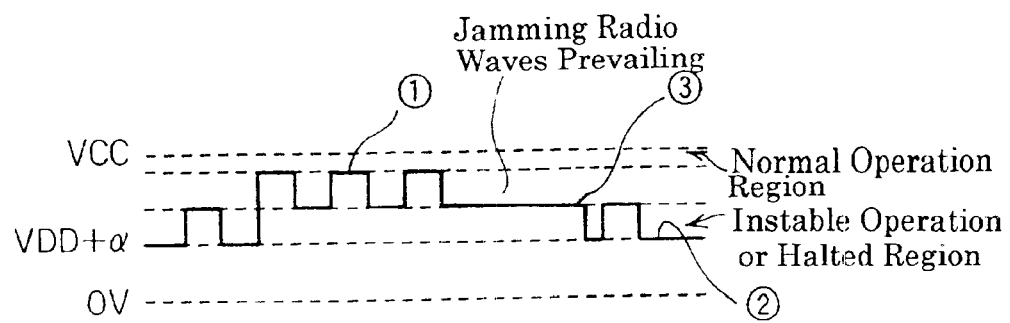
FIG. 34 is a chart showing a waveform appearing in the circuit shown in FIG. 33.
Figure 35:
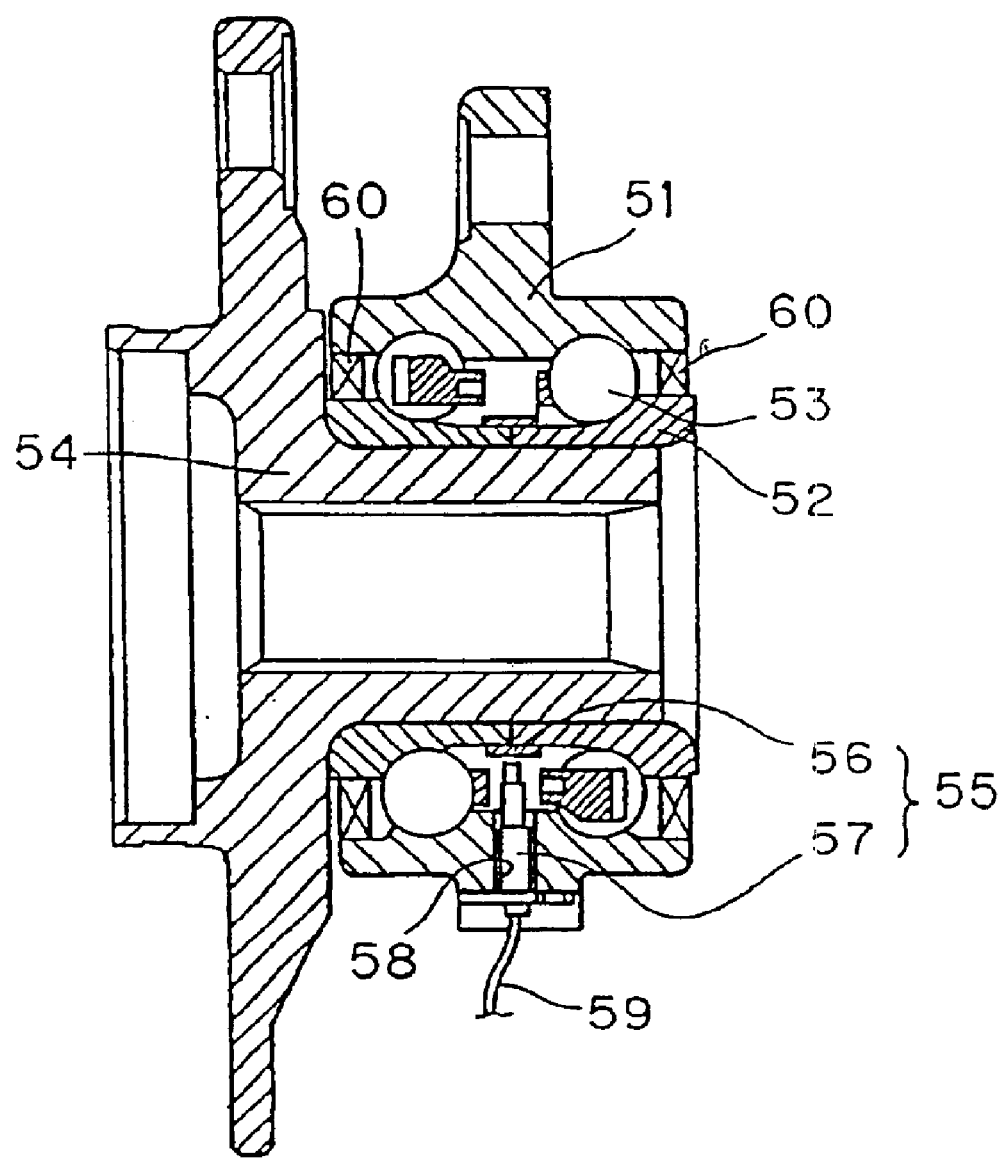
FIG. 35 is a longitudinal sectional view of the prior art wheel support bearing assembly.

With the output circuit 98 of the structure shown in FIG. 33, the output from this output circuit 98 represents such a waveform as shown in FIG. 34 depending on one of the previously discussed conditions for the demodulated signal and the radio field strength signal.

Specifically, in the event of the condition (1) (when the demodulated signal appears and the radio field strength signal indicates the strong radio field strength), the transistor 116 associated with the radio field strength signal is switched off and the transistor 104 associated with the demodulated signal is alternately switched on and off. Accordingly, the waveform of the output from the output circuit 98 during this condition (1) is a waveform of the normal operation such as indicated by a region (1) in FIG. 34.

In the event of the condition (2) (when the radio field strength signal indicates the feeble radio field strength regardless of the presence or absence of the demodulated signal), the transistor 116 associated with the radio field strength signal is switched on and, hence, the output from the output circuit 98 during this condition (2) represents such a waveform as indicated by (2) in FIG. 34.

In the event of the condition (3) (when the demodulated signal does not appear and the radio field strength signal indicates the strong radio field strength), the transistor 116 associated with the radio field strength signal is switched off and the transistor 114 associated with the demodulated signal is switched on. Accordingly, the output from the output circuit 98 during this condition (3) represents a voltage level as shown by (3) in FIG. 34.

Figure 30:
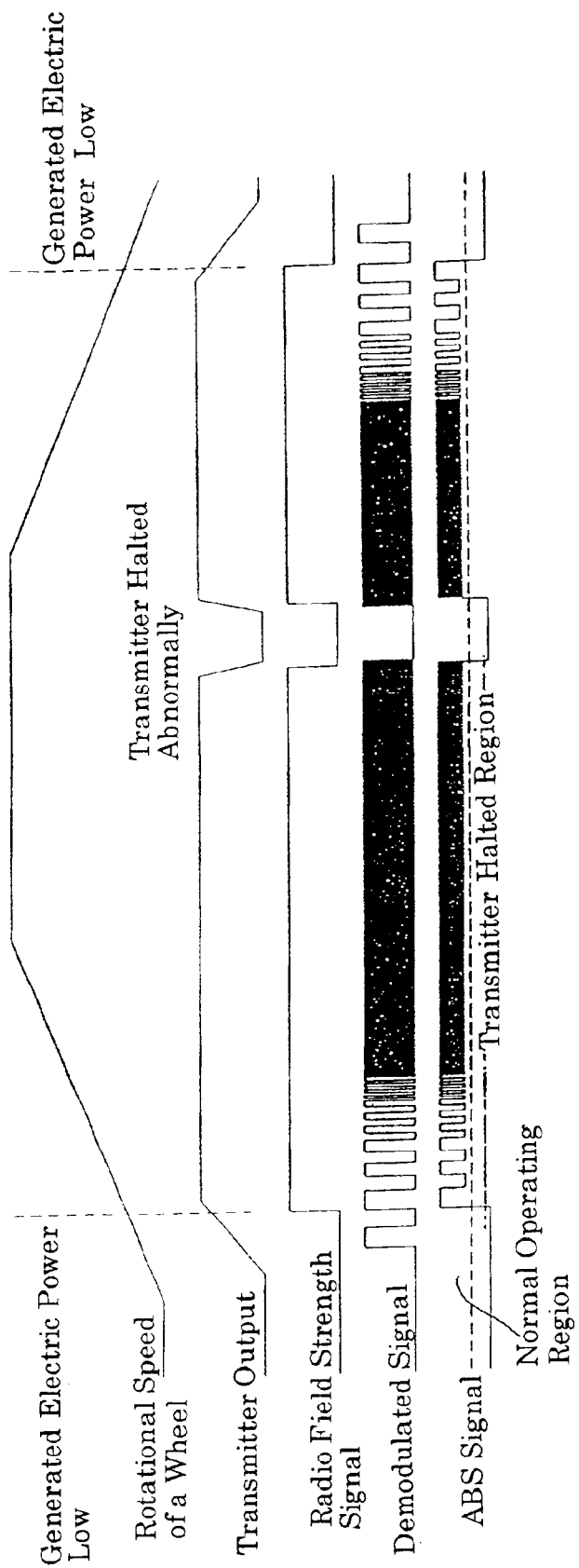
FIG. 30 is a chart showing various waveforms appearing during the operation of the wireless transmission system shown in FIG. 29.

FIG. 30 illustrates a waveform chart showing a relation among the rotational speed of the wheel 13 detected by the sensor 17, the output transmitted from the transmitting unit 5, the radio field strength signal, the demodulated signal, and the ABS signal.

The operation of the circuit arrangement discussed above will now be described. Referring again to FIG. 28, the signal indicative of the number of revolutions of the wheel detected by the sensor 17 is transmitted wireless from the transmitting unit 5 in the wheel support bearing assembly 1 to the receiving unit 25 on the side of the automobile body structure, and the controller 86 performs the control of the braking force in dependence on the ABS signal outputted from the receiving unit 25.

Since at this time the ABS signal represents one of the output waveforms as shown in FIG. 32 or FIG. 34 depending on one of the previously discussed conditions with respect to the demodulated signal and the radio field strength signal, the controller 86 can determine in reference to the ABS signal supplied thereto, if the transmitting unit 5 is operating normally, halted or disturbed by the jamming radio waves and, accordingly, the control appropriate to the condition can be performed. In other words, in the event that the controller 86 determines that the transmitting unit 5 is disturbed by the jamming radio waves or halted, it is possible to refrain the control of the braking force from being erroneously performed based on the result of determination.

According to the embodiment shown in and described with reference to FIGS. 28 to 34, the output circuit 98 of the receiving unit 25 is so configured as to output the ABS signal that represents the voltage of the duplex signal in which the demodulated signal and the radio field strength signal are duplexed. Accordingly, the number of wiring lines which would be required between the receiving unit 25 and the controller 86 can advantageously be reduced. In particular, where the output circuit 98 is of the structure shown in FIG. 33, the single line is sufficient to supply the electric power and to output the signal and, therefore, the number of the wiring lines can further be reduced advantageously. Accordingly, this contributes to reduction in weight of the automotive vehicle as a whole.

Also, in this embodiment, since the frequency modulation system is employed, utilization of the signal outputted from the sensor 17 and subsequently outputted from the transmitter 5 can facilitate the receiving unit 25 to sufficiently and easily detect the signal component indicative of the rotation speed and the signal component indicative of the radio field strength.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An anti-skid braking device for, by detecting a rotational speed of a wheel rotatably supported by an automotive body structure using a wheel support bearing assembly rotatably supporting a wheel relative to an automotive body structure and comprising an outer member having an inner peripheral surface formed with plural rows of raceways, an inner member having raceways defined therein in face-to-face relation with the raceways in the outer member, plural rows of rolling elements accommodated between the raceways in the outer and inner members, an electric generator generating an electric power as one of the outer and inner members rotates relative to the other of the outer and inner members, and a wireless transmitter transmitting wireless a signal indicative of a number of revolutions of the wheel that is outputted from the electric generator, controlling a braking force in response to a detection signal indicative of the rotational speed of the wheel, said anti-skid braking device comprising:

a pulsar ring mounted on a rotary member of a wheel, which serves as the inner member, making up a part of the electric generator;

a sensor mounted on a wheel support member in face-to-face relation with the pulsar ring and forming another part of the electric generator;

the wireless transmitter including a transmitter installed on the wheel support member, and a receiver installed on the automotive body structure, the transmitter transmitting the signal from the sensor by way of a feeble radio wave, the receiver including a demodulating circuit that provides the transmitted signal and a radio field strength signal indicative of the field strength of the transmitted radio wave; and a controller installed on the automotive body structure determining a control of a braking force in dependence on the sensor output signal and the radio field strength signal.

2. The anti-skid braking device as claimed in claim 1, wherein the controller controls not to perform an anti-skid braking operation unless a predetermined condition is satisfied in dependence on the sensor output signal and the radio field strength signal.

3. The anti-skid braking device as claimed in claim 1, wherein the controller determines the control in reference to a voltage of a duplex signal in which the sensor output signal and the radio field strength signal are duplexed.

4. The anti-skid braking device as claimed in claim 1, wherein the transmitter transmits the feeble radio wave by frequency modulating the sensor output signal, and the receiver detects the sensor output signal and the radio field strength signal by demodulating the feeble radio wave.

5. The anti-skid braking device as claimed in claim 1, wherein the controller includes a software program describing procedures to determine the control of the braking force in dependence on the sensor output signal and the radio field strength signal, and a computer capable of executing the software program.

6. The anti-skid braking device as claimed in claim 1, wherein the pulsar ring is mounted on a rotation side bearing member of the bearing assembly supporting the wheel rotatably, and the sensor is mounted on a stationary side bearing member of the bearing assembly.

7. A method of controlling an anti-skid braking device for, by detecting a rotational speed of a wheel rotatably supported by an automotive body structure using a wheel support bearing assembly rotatably supporting a wheel relative to an automotive body structure and comprising an outer member having an inner peripheral surface formed with plural rows of raceways, an inner member having raceways defined therein in face-to-face relation with the raceways in the outer member, plural rows of rolling elements accommodated between the raceways in the outer and inner members, an electric generator generating an electric power as one of the outer and inner members rotates relative to the other of the outer and inner members, and a wireless transmitter transmitting wireless a signal indicative of a number of revolutions of the wheel that is outputted from the electric generator, controlling a braking force in response to a detection signal indicative of the rotational speed of the wheel, said method comprising:

detecting a rotational speed of the wheel by way of a pulsar ring mounted on a rotary member of a wheel, which serves as the inner member, making up a part of the electric generator, and a sensor mounted on a wheel support member in face-to-face relation with the pulsar ring and forming another part of the electric generator;

wireless transmitting causing a transmitter, installed on the wheel support member, to transmit a feeble radio wave as a sensor output signal outputted from the sensor, causing a receiver, installed on the automotive body structure, and including a demodulating circuit to receive the feeble radio signal to thereby detect the sensor output signal and a radio field strength signal;

determining, by way of a controller installed on the automotive body structure, a control of a braking force in dependence on the sensor output signal and the radio field strength signal.

8. An anti-skid braking device, comprising:

a wheel support bearing assembly having rotatable and non-rotatable race members, and plural rows of rolling elements accommodated between respective raceways in the race members;

a pulsar ring mounted on the rotatable race member;

a sensor mounted on a wheel support member in face-to-face relation with the pulsar ring;

an electric generator generating an electric power as the race members rotate relative to each other, and comprising the pulsar ring and the sensor;

a wireless transmitter including a transmitter installed on the wheel support member, and a receiver installed on an automotive body structure, the transmitter transmitting a signal from the sensor by way of a feeble radio wave, the receiver including a demodulation circuit and receiving the feeble radio wave to detect a sensor output signal and a radio field strength signal; and a controller installed on the automotive body structure determining a control of a braking force in dependence on the sensor output signal and the radio field strength signal.

* * * * *

UNITED STATES PATENT AND TRADEMARK OFFICE
CERTIFICATE OF CORRECTION

PATENT NO. : 6,879,149 B2
DATED : April 12, 2005
INVENTOR(S) : Koichi Okada et al.

It is certified that error appears in the above-identified patent and that said Letters Patent is hereby corrected as shown below:

Column 38,
Line 8, change "demodulation" to -- demodulating --.

Signed and Sealed this

Twenty-seventh Day of December, 2005

JON W. DUDAS
*Director of the United States Patent and Trademark Office*